(12) United States Patent
Hatakeyama et al.

(10) Patent No.: US 6,715,307 B2
(45) Date of Patent: Apr. 6, 2004

(54) AIR CONDITIONER FOR VEHICLE

(75) Inventors: Jun Hatakeyama, Tokyo (JP); Satoshi Ogihara, Tokyo (JP)

(73) Assignee: Calsonic Kansei Corporation, Tokyo (JP)

(*) Notice: Subject to any disclaimer, the term of this patent is extended or adjusted under 35 U.S.C. 154(b) by 0 days.

(21) Appl. No.: 10/051,006

(22) Filed: Jan. 22, 2002

(65) Prior Publication Data

US 2002/0095943 A1 Jul. 25, 2002

(30) Foreign Application Priority Data

Jan. 24, 2001 (JP) .................................. 2001-016009

(51) Int. Cl.⁷ ............................................. B60H 1/32
(52) U.S. Cl. ............................. 62/244; 162/42; 162/43
(58) Field of Search ..................... 62/244, 180, 191.4; 165/42, 43, 202

(56) References Cited

U.S. PATENT DOCUMENTS

| | | | |
|---|---|---|---|
| 5,291,941 A | 3/1994 | Enomoto et al. | 165/62 |
| 5,899,086 A * | 5/1999 | Noda et al. | 62/244 |
| 5,910,157 A * | 6/1999 | Noda | 62/244 |
| 6,105,666 A | 8/2000 | Tajima et al. | |
| 2001/0003311 A1 | 6/2001 | Karl | |

FOREIGN PATENT DOCUMENTS

| | | | |
|---|---|---|---|
| DE | 199 21 812 | 11/2000 | |
| EP | 0 888 912 A2 * | 1/1999 | ............ B60H/1/00 |
| EP | 0 913 281 | 5/1999 | |
| EP | 0 960 756 | 12/1999 | |
| JP | 2-290475 | 11/1990 | |
| JP | 5-223357 | 8/1993 | |
| JP | 407257159 A * | 10/1995 | ............ B60H/1/32 |
| JP | 407315036 A * | 12/1995 | ............ B60H/1/03 |
| JP | 9-142134 | 6/1997 | |
| JP | 9-175140 | 7/1997 | |
| JP | 10-6738 | 1/1998 | |
| JP | 10-44742 | 2/1998 | |
| JP | 411028926 A * | 2/1999 | ............ B60H/1/00 |
| JP | 11115466 A * | 4/1999 | ............ B60H/1/03 |
| JP | 411235923 A * | 8/1999 | ............ B60H/1/32 |
| JP | 02000289455 A * | 10/2000 | ............ B60H/3/00 |
| JP | 02002187425 A * | 7/2002 | |
| WO | WO 00/20240 | 4/2000 | |

* cited by examiner

*Primary Examiner*—William E. Tapolcai
*Assistant Examiner*—Mohammad M. Ali
(74) *Attorney, Agent, or Firm*—Foley & Lardner

(57) ABSTRACT

A sub-condenser 4 is disposed in a within-vehicle-compartment air passage P1, so that the sub-condenser is permitted to receive heat from a heater core 21.

28 Claims, 9 Drawing Sheets

AIR CONDITIONER FOR VEHICLE

BACKGROUND OF THE INVENTION

1. Field of the Invention

The present invention relates to an air conditioner for a vehicle for air-conditioning a temperature environment within a vehicle compartment.

2. Description of the Related Art

A conventional air conditioner for a vehicle is used to air-condition a temperature environment within a vehicle compartment. The conventional air conditioner generally comprises a refrigeration cycle for circulating a refrigerant to thereby exchange heat between refrigerant and air, and a hot water line for exchanging heat using engine cooling water heated by heat that is exhausted from an engine.

In the conventional air conditioner for a vehicle, in an air passage within a vehicle compartment (which is hereinafter referred to as a within-vehicle-compartment air passage) into which the inside air and outside air can be selectively introduced, there are disposed an evaporator serving as a heat absorbing within-vehicle-compartment heat exchanger to be incorporated into the refrigeration cycle, and a heater core which serves as a heat generator and is incorporated into the hot water line. And, in case where the heat of the air flowing through the within-vehicle-compartment air passage is absorbed into the refrigerant existing within the evaporator, there is produced the cool air; and, in case where the air flowing through the within-vehicle-compartment air passage is heated by the heater core, there is produced the warm air. Also, in case where the rate between the cool air and warm air is adjusted by an air mix door, the temperature within the vehicle compartment can be adjusted.

By the way, in the above-structured conventional air conditioner for a vehicle, since the warm air is produced by the heater core which uses the engine cooling water as a heat medium, in a state where the temperature of the engine cooling water is not yet sufficiently high, for example, just after the engine is started, or when the running load is small, the temperature within the vehicle compartment cannot be raised up to a satisfactory level.

In order to cope with the above problem and thus enhance the heating performance, there are proposed air conditioners for a vehicle which are respectively disclosed in JP-A-9-175140 and JP-A-10-44742. In these air conditioners for a vehicle, a sub-condenser serving as a heat radiating within-vehicle-compartment heat exchanger for radiating the heat of the refrigerant into the air existing within the vehicle compartment is incorporated into the refrigeration line. And, the sub-condenser, together with the evaporator and heater core, is disposed in the above-mentioned within-vehicle-compartment air passage.

In the thus-structured air conditioners for a vehicle, since the warm air is produced not only by the heater core using the engine cooling water as a heat medium but also by the sub-condenser using the refrigerant as the heat medium, even in a state where the temperature of the engine cooling water is not yet sufficiently high, for example, just after the engine is started, or when the running load is small, the temperature within the vehicle compartment can be raised relatively rapidly.

Recently, the atmosphere of the space within the vehicle compartment has been made more and more comfortable and, with the increasing comfort of the vehicle compartment, there has been raised the need to enhance the performance of the air conditioner for a vehicle, especially, there has been strongly raised the need to further enhance the quick heating performance of the air conditioner for raising the temperature within the vehicle compartment quickly.

In the above-mentioned air conditioners for a vehicle, as a factor in hindering the further enhancement in the quick heating performance thereof, there can be pointed out the fact that, when the air conditioners for a vehicle are started, because the temperature load of the sub-condenser is low, the discharge pressure (Pd) of the refrigerant is hard to rise.

To enhance the temperature load of the sub-condenser, it is very effective to transmit heat from another heat source to the sub-condenser. According to an air conditioner for a vehicle disclosed in JP-A-10-44742, since, in a within-vehicle-compartment air passage, a heater core is disposed upstream of a sub-condenser, the heat of the heater core can be transmitted to the sub-condenser through the air flowing through the within-vehicle-compartment air passage, which makes it possible to enhance the temperature load of the sub-condenser.

However, during the time until the temperature of engine cooling water rises up to a specified value, in case where the air is allowed to flow through the within-vehicle-compartment air passage, the temperature of the air is lowered on the contrary. For this reason, during this time, preferably, the air may be prevented from flowing through the within-vehicle-compartment air passage. That is, in such case, since the heat of the heater core is not transmitted to the sub-condenser, the temperature load of the sub-condenser cannot be enhanced. Accordingly, a state, in which the refrigerant discharge pressure is hard to rise, continues for a given period of time, which makes it difficult to enhance the quick heating performance of the vehicle air conditioner further.

Also, in a state where the temperature load of the sub-condenser is low and the refrigerant discharge pressure is hard to rise, the efficiency of use of the refrigerant in the refrigeration cycle is lowered. Therefore, it is necessary to increase the enclosure amount of the refrigerant to a certain degree, and, as a liquid tank for holding therein a liquid-phase refrigerant temporarily, it is necessary to use a relatively-large-sized liquid tank, which provides a very great disadvantage in reducing the size and weight of the whole air conditioner for a vehicle.

SUMMARY OF THE INVENTION

An object of the present invention has been made to solve the above-mentioned drawbacks found in the conventional air conditioner for a vehicle. Accordingly, it is an object of the invention to provide an air conditioner for a vehicle which is excellent in the rapid heating performance and is able to realize reduction in the size and weight of the whole air conditioner for a vehicle.

In attaining the above object, according to a first aspect of the invention, there is provided an air conditioner for a vehicle, comprising: a compressor for compressing a refrigerant sucked therein and jetting out the compressed refrigerant therefrom; an outside-vehicle-compartment heat exchanger for radiating the heat of the refrigerant to the outside air; a heat radiating within-vehicle-compartment heat exchanger disposed in a within-vehicle-compartment air passage into which the inside air and the outside air can be introduced selectively for radiating the heat of the refrigerant to the air flowing through the within-vehicle-compartment air passage; an expander for expanding the refrigerant the heat of which has been radiated by at least one of the outside-vehicle-compartment heat exchanger and heat radiating within-vehicle-compartment heat exchanger; a heat absorbing within-vehicle-compartment heat exchanger disposed upstream of the heat radiating within-vehicle-compartment heat exchanger in the within-vehicle-compartment air passage for allowing the refrigerant expanded by the expander to absorb the heat of the air flowing through the within-vehicle-compartment air passage; and, a heat generator disposed in the within-vehicle-compartment air passage, wherein the heat radiating within-vehicle-compartment heat exchanger is disposed at a position which permits reception of the heat from the heat generator.

According to the first aspect of the invention, the refrigerant compressed by and jetted out from the compressor is supplied to at least one of the outside-vehicle-compartment heat exchanger and heat radiating within-vehicle-compartment heat exchanger, where the heat of the refrigerant is radiated. And, the refrigerant, the heat of which is radiated by at least one of the outside-vehicle-compartment heat exchanger and heat radiating within-vehicle-compartment heat exchanger, is supplied to and expanded by the expander.

The refrigerant expanded by the expander is supplied to the heat absorbing within-vehicle-compartment heat exchanger, where the refrigerant absorbs the heat of the air flowing through the within-vehicle-compartment air passage. And, the refrigerant, which has absorbed the heat of the air flowing through the within-vehicle-compartment air passage, is sucked into the compressor again. This series of cycles are repeated continuously.

In these cycles, in case where the air is introduced into the within-vehicle-compartment air passage, when the air passes through the heat absorbing within-vehicle-compartment heat exchanger disposed in the within-vehicle-compartment air passage, the heat of the air is absorbed by the refrigerant existing in the heat absorbing within-vehicle-compartment heat exchanger and the air is thereby dehumidified, so that the air turns into the cold air. Also, when the air passing through the within-vehicle-compartment air passage passes through the heat radiating within-vehicle-compartment heat exchanger and a heat generator respectively disposed in the within-vehicle-compartment air passage, the present air not only absorbs the heat of the refrigerant existing in the heat radiating within-vehicle-compartment heat exchanger but also absorbs the heat from the heat generator to be thereby heated, so that the air turns into the warm air.

Here, in the vehicle air conditioner according to the first aspect of the invention, since the heat radiating within-vehicle-compartment heat exchanger is disposed at a position which permits reception of the heat from the heat generator, even in a state where the air does not flow in the within-vehicle-compartment air passage, the heat from the heat generator is transmitted to the heat radiating within-vehicle-compartment heat exchanger. Due to this, the temperature load of the heat radiating within-vehicle-compartment heat exchanger can be increased, which makes it possible to raise the discharge pressure of the refrigerant rapidly.

Now, according to a second aspect of the invention, in an air conditioner for a vehicle as set forth in the first aspect of the invention, there are further included a first refrigerant line for supplying the refrigerant jetted out from the compressor to the expander through the outside-vehicle-compartment heat exchanger and allowing the refrigerant to be sucked into the compressor through heat absorbing within-vehicle-compartment heat exchanger; a second refrigerant line for supplying the refrigerant jetted out from the compressor to the expander through the heat radiating within-vehicle-compartment heat exchanger and allowing the refrigerant to be sucked into the compressor through the heat absorbing within-vehicle-compartment heat exchanger; and, a switch capable of selectively switching the first refrigerant line and second refrigerant line over to each other.

In the vehicle air conditioner according to the second aspect of the invention, when the first refrigerant line is selected by the switch, the refrigerant jetted out from the compressor is supplied to the outside-vehicle-compartment heat exchanger but is not supplied to the heat radiating within-vehicle-compartment heat exchanger. And, the refrigerant, the heat of which has been radiated by the outside-vehicle-compartment heat exchanger, is supplied to the expander; and, when the refrigerant passes through the heat absorbing within-vehicle-compartment heat exchanger, the refrigerant absorbs the heat of the air flowing through the within-vehicle-compartment air passage and, after then, the refrigerant is sucked into the compressor again.

On the other hand, when the second refrigerant line is selected by the switch, the refrigerant jetted out from the compressor is supplied to the heat radiating within-vehicle-compartment heat exchanger but is not supplied to the outside-vehicle-compartment heat exchanger. And, the refrigerant, the heat of which has been radiated by the heat radiating within-vehicle-compartment heat exchanger, is supplied to the expander; and, when the refrigerant passes through the heat absorbing within-vehicle-compartment heat exchanger, the refrigerant absorbs the heat of the air flowing through the within-vehicle-compartment air passage and, after then, the refrigerant is sucked into the compressor again.

Now, according to a third aspect of the invention, in an air conditioner for a vehicle as set forth in the first or second aspect of the invention, there are further included a third refrigerant line for supplying the refrigerant jetted out from the compressor to a second expander not connected to the heat absorbing within-vehicle-compartment heat exchanger through the heat radiating within-vehicle-compartment heat exchanger and allowing the refrigerant not only to bypass the heat absorbing within-vehicle-compartment heat exchanger but also to be sucked into the compressor; and, a switch capable of switching the selection of the third refrigerant line.

In the vehicle air conditioner according to the third aspect of the invention, when the third refrigerant line is selected by the switch, the refrigerant jetted out from the compressor is supplied to the heat radiating within-vehicle-compartment heat exchanger; and, the refrigerant, the heat of which has been radiated by the heat radiating within-vehicle-compartment heat exchanger, is supplied to the second expander not connected to the heat absorbing within-vehicle-compartment heat exchanger. And, the refrigerant, which has been expanded by the second expander not connected to the heat absorbing within-vehicle-compartment heat exchanger, bypasses the heat absorbing within-vehicle-compartment heat exchanger and is then sucked into the compressor again.

Now, according to a fourth aspect of the invention, in an air conditioner for a vehicle as set forth in the third aspect of the invention, in the third refrigerant line, there is disposed an inter-refrigerant heat exchanger for exchanging heat between the refrigerant expanded by the second expander and the refrigerant flowing through the front stage of the second expander.

In the vehicle air conditioner according to the fourth aspect of the invention, when the third refrigerant line is selected by the switch, the inter-refrigerant heat exchanger disposed in the third refrigerant line exchanges heat between the refrigerant expanded by the second expander not connected to the heat absorbing within-vehicle-compartment heat exchanger and the refrigerant flowing through the front stage of the second expander. And, the refrigerant, which has absorbed heat through this heat exchange operation, is sucked into the compressor.

Now, according to a fifth aspect of the invention, in an air conditioner for a vehicle as set forth in the third aspect of the invention, in the third refrigerant line, there is disposed an inter-refrigerant heat exchanger for exchanging heat between the refrigerant expanded by the second expander and the refrigerant in the front stage of the heat radiating within-vehicle-compartment heat exchanger.

In the vehicle air conditioner according to the fifth aspect of the invention, when the third refrigerant line is selected by the switch, the inter-refrigerant heat exchanger disposed in the third refrigerant line exchanges heat between the refrigerant expanded by the second expander not connected to the heat absorbing within-vehicle-compartment heat exchanger and the refrigerant in the front stage of the heat radiating within-vehicle-compartment heat exchanger the second expander. And, the refrigerant, which has absorbed heat through this heat exchange operation, is sucked into the compressor.

Now, according to a sixth aspect of the invention, in an air conditioner for a vehicle as set forth in any one of the first to fifth aspects of the invention, the heat generator is disposed upstream of the heat radiating within-vehicle-compartment heat exchanger in the within-vehicle-compartment air passage.

In the vehicle air conditioner according to the sixth aspect of the invention, the air flowing through the within-vehicle-compartment air passage absorbs the heat from the heat generator and is thereby heated; and, after then, the air absorbs the heat of the refrigerant in the heat radiating within-vehicle-compartment heat exchanger and is thereby heated further.

Now, according to a seventh aspect of the invention, in an air conditioner for a vehicle as set forth in any one of the first to sixth aspects of the invention, the heat radiating within-vehicle-compartment heat exchanger and a heat generator are formed as an integral body.

In the vehicle air conditioner according to the seventh aspect of the invention, the heat from the heat generator is transmitted directly to the heat radiating within-vehicle-compartment heat exchanger.

Now, according to an eighth aspect of the invention, there is provided an air conditioner for a vehicle, comprising at least: a compressor for compressing a refrigerant sucked therein and jetting out the compressed refrigerant to thereby allow the refrigerant to circulate; a within-vehicle-compartment heat exchanger disposed in a within-vehicle-compartment air passage, into which the inside air and the outside air can be introduced selectively, in such a manner that the circulating refrigerant can be supplied to the within-vehicle-compartment heat exchanger; a heat generator disposed in the within-vehicle-compartment air passage; and, an expander for expanding the circulating refrigerant, wherein the within-vehicle-compartment heat exchanger is disposed at a position which permits reception of the heat from the heat generator.

In the vehicle air conditioner according to the eighth aspect of the invention, in case where the air is introduced into the within-vehicle-compartment air passage while the within-vehicle-compartment heat exchanger functions as a heat radiator, the air flowing through the within-vehicle-compartment air passage, when passing through the within-vehicle-compartment heat exchanger and a heat generator, not only absorbs the heat of the refrigerant in the within-vehicle-compartment heat exchanger but also absorbs the heat from the heat generator to be thereby heated, with the result that the air turns into the warm air.

Here, in the vehicle air conditioner according to the eighth aspect of the invention, since the within-vehicle-compartment heat exchanger is disposed at a position permitting reception of heat from the heat generator, even in a state where the air does not flow in the within-vehicle-compartment air passage, the heat from the heat generator is transmitted to a heat radiating within-vehicle-compartment heat exchanger. Thanks to this, the temperature load of the heat radiating within-vehicle-compartment heat exchanger can be increased, which makes it possible to raise the discharge pressure of the refrigerant rapidly.

Now, according to a ninth aspect of the invention, in an air conditioner for a vehicle as set forth in the eighth aspect of the invention, the heat generator is disposed upstream of the within-vehicle-compartment heat exchanger in the within-vehicle-compartment air passage.

In the vehicle air conditioner according to the ninth aspect of the invention, the air flowing through the within-vehicle-compartment air passage absorbs the heat from the heat generator and is thereby heated and, after then, the air absorbs the heat of the refrigerant in the within-vehicle-compartment heat exchanger functioning as a radiator and is thereby heated further.

Now, according to a tenth aspect of the invention, in an air conditioner for a vehicle as set forth in the eighth or ninth aspect of the invention, the within-vehicle-compartment heat exchanger and a heat generator are formed as an integral body.

In the vehicle air conditioner according to the tenth aspect of the invention, the heat from the heat generator is transmitted directly to the within-vehicle-compartment heat exchanger.

According to the first aspect of the invention, even in a state where the air does not flow in the within-vehicle-compartment air passage, the heat from the heat generator is effectively transmitted to the heat radiating within-vehicle-compartment heat exchanger to thereby be able to increase the temperature load of the heat radiating within-vehicle-compartment heat exchanger and thus raise the discharge pressure of the refrigerant rapidly. That is, the first aspect of the invention allows the present vehicle air conditioner to fulfill a very excellent quick heating performance.

Also, since the temperature load of the heat radiating within-vehicle-compartment heat exchanger can be increased and the discharge pressure of the refrigerant can be thereby raised rapidly, the use efficiency of the refrigerant can be enhanced and thus the quantity of the refrigerant to be enclosed can be reduced. Therefore, according to the first aspect of the invention, it is possible to realize reduction in the size and weight of the whole vehicle air conditioner.

According to the second aspect of the invention, in the cooling operation time, the first refrigerant line is selected; whereas, in the heating operation time, the second refrigerant line is selected. That is, in the cooling operation time, the heat radiating within-vehicle-compartment heat exchanger is not used. This can avoid an inconvenience that, in the cooling operation time, the refrigerant, the heat of which has been radiated by the outside-vehicle-compartment heat exchanger, can absorb the heat from the heat generator to thereby lower the cooling efficiency of the vehicle air conditioner.

According to the third aspect of the invention, in the heating operation time, the third refrigerant line is selected; that is, in the heating operation time, the heat absorbing within-vehicle-compartment heat exchanger is not used. This not only can eliminate the need of execution of complicated operations such as a high-accuracy inside air and outside air introduction operation necessary for prevention of the over-cooling of the heat absorbing within-vehicle-compartment heat exchanger in the heating operation time, but also allows the vehicle air conditioner to fulfill an excellent quick heating performance.

According to the fourth aspect of the invention, in case where the third refrigerant line is selected, since the temperature of the refrigerant to be sucked into the compressor can be raised effectively, the quick heating performance can be enhanced further.

According to the fifth aspect of the invention, in case where the third refrigerant line is selected, since the temperature of the refrigerant to be sucked into the compressor can be raised effectively, the quick heating performance can be enhanced further.

According to the sixth aspect of the invention, the transmission efficiency of the heat to be transmitted from the heat generator to the heat radiating within-vehicle-compartment heat exchanger can be enhanced, which makes it possible to enhance the quick heating performance still further.

According to the seventh aspect of the invention, the transmission efficiency of the heat to be transmitted from the heat generator to the heat radiating within-vehicle-compartment heat exchanger can be enhanced, which makes it possible to enhance the quick heating performance still further.

According to the eighth aspect of the invention, even in a state where the air does not flow in the within-vehicle-compartment air passage, the heat from the heat generator is effectively transmitted to the within-vehicle-compartment heat exchanger serving as a heat radiator to thereby be able to increase the temperature load of the present within-vehicle-compartment heat exchanger and thus raise the discharge pressure of the refrigerant rapidly. That is, the first aspect of the invention allows the present vehicle air conditioner to fulfill a very excellent quick heating performance.

Also, since the temperature load of the within-vehicle-compartment heat exchanger can be increased and the discharge pressure of the refrigerant can be thereby raised rapidly, the use efficiency of the refrigerant can be enhanced and thus the quantity of the refrigerant to be enclosed can be reduced. Therefore, according to the eighth aspect of the invention, it is possible to realize reduction in the size and weight of the whole vehicle air conditioner.

According to the ninth aspect of the invention, the transmission efficiency of the heat to be transmitted from the heat generator to the within-vehicle-compartment heat exchanger serving as a heat radiator can be enhanced, which makes it possible to enhance the quick heating performance still further.

According to the tenth aspect of the invention, the transmission efficiency of the heat to be transmitted from the heat generator to the within-vehicle-compartment heat exchanger serving as a heat radiator can be enhanced further, which makes it possible to enhance the quick heating performance still further.

DETAIELD DESCRIPTION OF THE PRESENT INVENTION

Now, description will be given below in detail of the mode for carrying out the invention with reference to the accompanying drawings.

Figure 1:
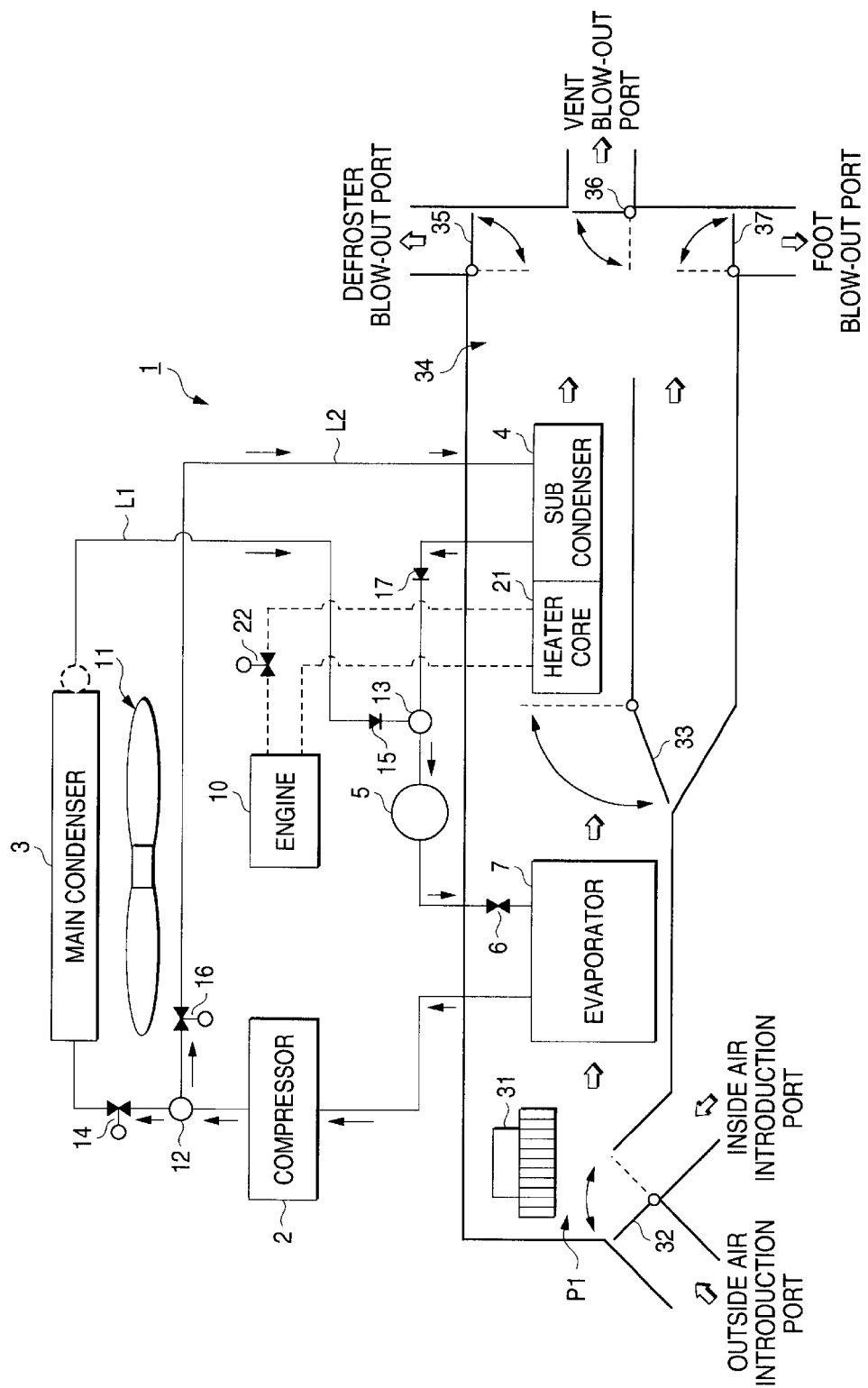
FIG. 1 is a schematic block diagram of the structure of a first embodiment of a vehicle air conditioner according to the invention.

FIG. 1 shows schematically the structure of an embodiment of an air conditioner for a vehicle according to the invention. The air conditioner for a vehicle shown in FIG. 1 comprises a refrigeration cycle for circulating a refrigerant and a hot water line for circulating engine cooling water.

In the refrigeration cycle, a compressor 2, a main condenser 3 serving as an outside-vehicle-compartment heat exchanger, a sub-condenser 4 serving as a heat radiating within-vehicle-compartment heat exchanger, a liquid tank 5, an expansion valve 6 serving as an expander, and an evaporator 7 serving as a heat absorbing within-vehicle-compartment heat exchanger are connected to one another through pipe members; and, a refrigerant, when energy is given thereto by the compressor 2, is allowed to circulate between the above respective components.

The compressor 2, which is disposed outside a vehicle compartment such as an engine room, compresses a vapor-phase refrigerant having a low pressure absorbed therein and jets out the compressed refrigerant therefrom as a vapor-phase refrigerant having a high pressure. The compressor 2 can be driven, for example, by transmitting the power of a crankshaft of an engine 10 to the compressor 2 through a belt.

By the way, as the compressor 2, preferably, there may be used a variable-capacity compressor the refrigerant discharge amount of which can be controlled. In case where a variable-capacity compressor is used as the compressor 2, the cooling and heating performance is controlled according to the refrigerant discharge amount and, therefore, while reducing the required power of the compressor 2, the temperature within the vehicle compartment can be adjusted efficiently.

The main condenser 3 is used to radiate the heat of the high-temperature and high-pressure vapor-phase refrigerant jetted out from the compressor 2 to the outside. This main condenser 3 is disposed in such a manner that, when an air blower 11 such as an electric fan is driven, the air can be blown to the main condenser 3. The main condenser 3 exchanges heat between the high-temperature and high-pressure vapor-phase refrigerant passing within the main condenser 3 and the air blown to the main condenser 3 to thereby radiate the heat of the high-temperature and high-pressure vapor-phase refrigerant to the air.

The sub-condenser 4 is disposed in a within-vehicle-compartment air passage P1 (which will be discussed later) and is used to radiate the heat of the high-temperature and high-pressure vapor-phase refrigerant jetted out from the compressor 2 to the air flowing in the within-vehicle-compartment air passage P1. The air flowing in the within-vehicle-compartment air passage P1 absorbs the heat of the refrigerant radiated by the sub-condenser 4 and thus turns into the warm air, so that the warm air flows to the downstream side of the within-vehicle-compartment air passage P1.

By the way, in the air conditioner for a vehicle 1 shown in FIG. 1, the sub-condenser 4 and main condenser 3 are connected together in parallel, which makes it possible to selectively use the sub-condenser 4 and main condenser 3. That is, a passage for the refrigerant jetted out from the compressor 2 branches through a three-way connector 12 into a first refrigerant line L1 which passes through the main condenser 3, and a second refrigerant line L2 passing through the sub-condenser 4. And, in the front stage of the liquid tank 5, the first and second refrigerant lines L1 and L2 join together through another three-way connector 13.

In the case of the first refrigerant line L1, in the front stage of the main condenser 3, there is disposed an electromagnetic valve 14; and, in the rear stage of the main condenser 3, there is disposed a check valve 15. Similarly, in the case of the second refrigerant line L2 as well, in the front stage of the sub-condenser 4, there is disposed an electromagnetic valve 16; and, in the rear stage of the sub-condenser 4, there is disposed a check valve 17. And, in case where the open and closed states of the electromagnetic valve 14 disposed in the first refrigerant line L1 and the open and closed states of the electromagnetic valve 16 disposed in the second refrigerant line L2 are switched over to each other by a control unit (not shown) for controlling the operation of the whole vehicle air conditioner 1, the first refrigerant line L1 or second refrigerant line L2 can be selected.

Specifically, in the cooling operation time of the vehicle air conditioner 1, the electromagnetic valve 14 disposed in the first refrigerant line L1 is set in the "open" state, whereas the electromagnetic valve 16 disposed in the second refrigerant line L2 is set in the "closed" state. As a result of this, the first refrigerant line L1 is selected, so that the refrigerant jetted out from the compressor 2 is supplied to the main condenser 3. On the other hand, in the heating operation time of the vehicle air conditioner 1, the electromagnetic valve 14 disposed in the first refrigerant line L1 is set in the "closed" state, whereas the electromagnetic valve 16 disposed in the second refrigerant line L2 is set in the "open" state. As a result of this, the second refrigerant line L2 is selected, so that the refrigerant jetted out from the compressor 2 is supplied to the sub-condenser 3.

As described above, in the air conditioner for a vehicle 1, the control unit functions as a switch which is capable of selectively switching the first and second refrigerant lines L1 and L2; that is, the passage of the refrigerant jetted out from the compressor 2 can be switched between the cooling and heating operations by the control unit, so that the main condenser 3 and sub-condenser 4 can be used selectively.

The liquid tank 5 is used to hold therein temporarily a liquid-phase refrigerant which is obtained when the heat of the refrigerant is radiated by the main condenser 3 or sub-condenser 4 and the refrigerant is thereby liquefied. This liquid tank 5 includes a dust-proof filter and thus has a function to remove dust mixed into the liquid-phase refrigerant held therein. By the way, preferably, the liquid tank 5 may be disposed in the rear stage of the three-way connector 13. However, when it is difficult to dispose the liquid tank 5 in the rear stage of the three-way connector 13 due to the limit of the pipe lay-out arrangement within the engine room, as shown by a one-dot chained line in FIG. 1, the liquid tank 5 may be disposed just behind the main condenser 3 or may be disposed so as to be integral with the main condenser 3. In this case, the liquid-phase refrigerant, which is liquefied due to the radiation of the heat from the refrigerant by the sub-condenser 4, is supplied directly to the expansion valve 6 not through the liquid tank 5.

The expansion valve 6 expands suddenly the liquid-phase refrigerant, which is obtained when the heat of the refrigerant is radiated by the main condenser 3 or sub-condenser 4 and is then held in the liquid tank 5 temporarily, to thereby be able to supply the liquid-phase refrigerant to the evaporator 7 in the form of a mist-like refrigerant of low temperature and high pressure.

The evaporator 7 is disposed upstream of the sub-condenser 4 in the within-vehicle-compartment air passage P1 and allows the heat of the air flowing through the within-vehicle-compartment air passage P1 to be absorbed by the mist-like refrigerant of low temperature and high pressure supplied from the expansion valve 6. The refrigerant supplied to the evaporator 7 as the mist-like refrigerant of low temperature and high pressure, when passing through the evaporator 7, absorbs the heat of the air flowing through the within-vehicle-compartment air passage P1 and is thereby vaporized. And, the vapor-phase refrigerant is sucked into the compressor 2, is compressed again and is jetted out from the compressor 2. On the other hand, in the case of the air the heat of which is absorbed by the refrigerant within the evaporator 7, it is dehumidified to thereby turn into the cold air, so that the cold air then flows to the downstream side of the within-vehicle-compartment air passage P1.

The refrigeration cycle allows the refrigerant to circulate in the above-mentioned manner and carries out heat exchange in the main condenser 3 or sub-condenser 4 and in the evaporator 7, thereby generating the warm air or cold air in the within-vehicle-compartment air passage P1.

Now, the hot water line carries out heat by allowing the engine cooling water to circulate, that is, by using the engine cooling water the temperature of which has been raised up to a high temperature due to the waste heat of the engine 10; and, a heater core 21 serving as a heat generator is incorporated into the hot water line.

The heater core 21, together with the sub-condenser 4, is disposed downstream of the evaporator 7 in the within-vehicle-compartment air passage P1; and, using, as its heat medium, the engine cooling water to be supplied through a pipe member from the water jacket of the engine 10, that is, the engine cooling water the temperature of which has been raised up to a high temperature due to the waste heat of the engine 10, the heater core 21 generates heat due to the heat of the high-temperature engine cooling water. And the air flowing in the within-vehicle-compartment air passage P1 absorbs not only the heat of the refrigerant the heat of which is radiated by the above-mentioned sub-condenser 4 but also the heat given from the heater core 21. In this manner, the warm air can be produced effectively in the within-vehicle-compartment air passage P1. By the way, in the pipe member for supplying the engine cooling water from the water jacket of the engine 10 to the heater core 21, there is disposed a water valve 22; and, the water valve 22 can be adjusted under the control of the above-mentioned control unit, whereby the flow rate of the engine cooling water to be supplied to the heater core 21, that is, the heating value of the heater core 21 can be adjusted.

By the way, in the air conditioner for a vehicle 1 according to the invention, the sub-condenser 4, which is a heat radiating within-vehicle-compartment heat exchanger, is disposed at a position where it is able to receive the heat from the heater core 21 serving as a heat generator. Here, the position permitting reception of the heat from the heater core 21 means a position to which the heat from the heater core 21 can be transmitted. Specifically, for example, in case where the sub-condenser 4 is disposed at a position very near to the heater core 21, or in case where the sub-condenser 4 and heater core 21 are formed as an integral body, the sub-condenser 4 is able to receive the heat from the heater core 21.

In the air conditioner for a vehicle 1 according to the invention, as described above, since the sub-condenser 4 serving as a heat radiating within-vehicle-compartment heat exchanger, is disposed at a position where it is able to receive the heat from the heater core 21 serving as a heat generator, as will be discussed later in detail, by increasing the temperature load of the sub-condenser 4, the refrigerant discharge pressure (Pd) can be increased quickly, which makes it possible to fulfill its quick heating performance very excellently.

By the way, to fulfill the quick heating performance more excellently, preferably, the heater core 21 serving as a heat generator may be disposed upstream of the sub-condenser 4 which serves as a heat radiating within-vehicle-compartment heat exchanger in the within-vehicle-compartment air passage P1.

That is, in case where the heater core 21 is disposed downstream of the sub-condenser 4, the air, which is introduced into the within-vehicle-compartment air passage P1 and is passed through the evaporator 7 to be thereby turn into the cold air, is contacted directly with the sub-condenser 4 to thereby decrease the temperature load of the sub-condenser 4 further, which makes it difficult to raise the refrigerant discharge pressure. On the other hand, in case where the heater core 21 is disposed upstream of the sub-condenser 4, the air, which has been turned into the cold air by the evaporator 7, is contacted through the heater core 21 with the sub-condenser 4 and, therefore, the temperature load of the sub-condenser 4 is not decreased so much, which makes it possible to raise the refrigerant discharge pressure further quickly. Also, in this case, since the heat of the heater core 21 can also be transmitted to the sub-condenser 4 through the air flowing in the within-vehicle-compartment air passage P1, the transmission efficiency of the heat to be transmitted from the heater core 21 to the sub-condenser 4 can enhanced, which makes it possible to fulfill the quick heating performance more excellently.

Also, to enhance the quick heating performance further, preferably, the sub-condenser 4 serving as a heat radiating within-vehicle-compartment heat exchanger and the heater core 21 serving as a heat generator may be formed as an integral body. In case where the sub-condenser 4 and heater core 21 are formed as an integral body, since the heat from the heater core 21 is transmitted directly to the sub-condenser 4, the transmission efficiency of the heat to be transmitted from the heater core 21 to the sub-condenser 4 can enhanced, which makes it possible to fulfill the quick heating performance quite excellently.

Also, In case where the sub-condenser 4 and heater core 21 are formed as an integral body, there can be provided a great advantage in reducing the size of the whole vehicle air conditioner as well as the manufacturing cost thereof. Here, as a method of forming the sub-condenser 4 and heater core 21 as an integral body, for example, the fins of the sub-condenser 4 may be formed integral with the fins of the heater core 21.

On the upstream side of the within-vehicle-compartment air passage P1, there is disposed a blower fan 31. In the vehicle air conditioner 1, in case where the blower fan 31 is driven under the control of the above-mentioned control unit, the outside air is introduced into the within-vehicle-compartment air passage P1 from an outside air introduction port, or the inside air is introduced into the within-vehicle-compartment air passage P1 from an inside air introduction port, the outside air or inside air is allowed to flow through the within-vehicle-compartment air passage P1. By the way, in the vicinity of the outside air introduction port or inside air introduction port, there is disposed an intake door 32 and, in case where the intake door 32 is driven under the control of the control unit, the outside air or inside air can be selectively introduced into the within-vehicle-compartment air passage P1.

The air (outside air or inside air) introduced into the within-vehicle-compartment air passage P1 from the outside or inside air introduction port, firstly, passes through the evaporator 7 disposed on the upstream side of the within-vehicle-compartment air passage P1. At the then time, as described before, the heat of the air passing through the evaporator 7 is absorbed by the refrigerant existing in the evaporator 7, that is, the air is dehumidified and is thereby turned into the cold air, so that the cold air flows to the downstream side of the within-vehicle-compartment air passage P1.

In the case of the within-vehicle-compartment air passage P1, the downstream side of the evaporator 7 branches into a warm air passage, in which the heater core 21 and sub-condenser 4 are disposed, and a detour passage bypassing the heater core 21 and sub-condenser 4. The air, which is introduced into the warm air passage, as described above, when passing through the heater core 21, absorbs the heat from the heater core 21 and, when passing through the sub-condenser 4, absorbs the heat radiated from the refrigerant existing within the sub-condenser 4 to thereby turn into the warm air, so that the warm air flows to the downstream side. On the other hand, the air, which is introduced into the detour passage, flows to the downstream side as it remains the cold air the heat of which has been absorbed into the evaporator 7.

Here, in a branch point, at which the warm air passage and detour passage are branched, there is disposed an air mix door 33 which is used to adjust the ratio of the flow rate of the air to be introduced into the warm air passage and the flow rate of the air to be introduced into the detour passage. And, in the vehicle air conditioner 1, in case where the air mix door 33 is driven under the control of the control unit to adjust the ratio of the flow rate of the air to be introduced into the warm air passage and the flow rate of the air to be introduced into the detour passage, finally, the temperatures of the air to be blown out from a defroster blow-out port, a vent blow-out port and a foot blow-out port can be adjusted.

On the further downstream side of the warm air passage and detour passage in the within-vehicle-compartment air passage P1, there is disposed an air mix chamber 34 which is used to mix the warm air from the warm air passage with the cold air from the detour passage. And, in the air mix chamber 34, there are formed a defroster blow-out port used to blow out the air, which is a mixture of the warm air and cold air and thus the temperature of which has been adjusted due to the mixing thereof, to a front windshield, a vent blow-out port for blowing out the air toward the upper body of an occupant, and a foot blow-out port for blowing out the air toward the foot of the occupant. In the vicinity of the blow-out port, vent blow-out port and foot blow-out port, there are disposed a defrost door 35, a vent door 36, and a foot door 37, respectively. In case where the defrost door 35, vent door 36 and foot door 37 are respectively driven under the control of the control unit, the flow rate of the temperature-controlled air to be blown out from the blow-out port, vent blow-out port and foot blow-out port can be adjusted.

In the above-structured vehicle air conditioner 1, since the air, which has passed through the evaporator 7 and has been thereby dehumidified, is heated by the heater core 21 and sub-condenser 4 to thereby produce the warm air, in the heating operation time, dehumidification can also be carried out, thereby being able to realize a very useful heating operation.

Also, in the present vehicle air conditioner 1, not only the heater core 21 serving as a heat generator, but also the sub-condenser 4 serving as a heat radiating within-vehicle-compartment heat exchanger are disposed in the within-vehicle-compartment air passage P1 and thus, using not only the heater core 21 but also the sub-condenser 4, the warm air can be produced. Thanks to this, even in case where the temperature of the engine cooling water is not sufficiently high, there can be obtained an excellent heating performance.

Especially, in the present vehicle air conditioner 1, since the sub-condenser 4 serving as a heat radiating within-vehicle-compartment heat exchanger is disposed at a position which permits reception of the heat from the heater core 21 serving as a heat generator, the heat from the heater core 21 can be effectively transmitted to the sub-condenser. Due to this, the temperature load of the sub-condenser 4 can be increased and thus the refrigerant discharge pressure (Pd) can be raised quickly, thereby being able to raise the temperature within the vehicle compartment; that is, the present vehicle air conditioner 1 is able to fulfill a very excellent quick heating performance.

Describing in more detail, in the start time of the present vehicle air conditioner 1, the temperature of the sub-condenser 4 is very low, that is, the temperature load of the sub-condenser 4 is low and thus the refrigerant discharge pressure is low. In case where the refrigerant discharge pressure is low in this manner, it is not possible to function the sub-condenser 4 instantaneously as a heating source for generating the warm air to thereby produce the warm air quickly. Therefore, it is desired that heat from a heating source such as the heater core 21 is transmitted to the sub-condenser 4 to thereby increase the temperature load of the sub-condenser 4. However, in case where the sub-condenser 4 is disposed at a position distant from the heater core 21, the heat of the heater core 21 cannot be transmitted to the sub-condenser 4 effectively. Especially, during the time until the engine cooling water temperature rises up to a specified value, in case where the air is allowed to flow into the within-vehicle-compartment air passage P1, the air is rather cooled against expectation and makes an occupant feel uncomfortable; and, therefore, the air is prevented from flowing into the within-vehicle-compartment air passage P1. For this reason, the heat of the heater core 21 cannot be transmitted to the sub-condenser 4 effectively. Due to this, the temperature load of the sub-condenser 4 remains low. In this case, a state, in which the refrigerant discharge pressure is difficult to rise, continues for a given period of time, which makes is difficult to raise the temperature within the vehicle compartment quickly.

On the other hand, in the vehicle air conditioner 1 according to the invention, since the sub-condenser 4 is disposed at a position permitting reception of the heat from the heater core 21, even in case where the air does not flow in the within-vehicle-compartment air passage P1, the heat from the heater core 21 can be effectively transmitted to the sub-condenser 4. Therefore, in the vehicle air conditioner 1 according to the invention, just after the start thereof, the temperature load of the sub-condenser 4 can be effectively increased and thus the refrigerant discharge pressure can be raised quickly, which enables the vehicle air conditioner 1 according to the invention to fulfill a very excellent quick heating performance.

Also, in the vehicle air conditioner 1 according to the invention, just after the start thereof, the temperature load of the sub-condenser 4 can be effectively increased and thus the refrigerant discharge pressure can be raised quickly, so that the enclosure amount of the refrigerant in the refrigeration cycle can be reduced. Therefore, it is not necessary to use a large-sized liquid tank 5, which provides a very great advantage in reducing the size and weight of the whole vehicle air conditioner 1. Also, because the refrigerant discharge pressure can be raised quickly, even in case where a variable-capacity compressor is used as the compressor 2, the amount of the refrigerant stored in a crank room can be reduced to thereby be able to enhance the response property of the variable-capacity compressor.

Also, in the vehicle air conditioner 1 shown in FIG. 1, as described before, the sub-condenser 4 and main condenser 3 are connected in parallel and thus the sub-condenser 4 and main condenser 3 can be used selectively. Therefore, in case where, in the cooling operation time, the refrigerant jetted out from the compressor 2 is supplied only to the main condenser 3 and, in the heating operation time, the refrigerant jetted out from the compressor 2 is supplied only to the sub-condenser 4, not only the above-mentioned heating performance can be enhanced but also the cooling efficiency in the cooling operation time can be enhanced.

That is, in a structure in which, in the cooling operation time, the refrigerant jetted out from the compressor 2 is supplied only to the sub-condenser 4, there is a possibility that the refrigerant within the sub-condenser 4 absorbs the heat from the heater core 21 and is thereby heated, which lowers the cooling efficiency. Especially, in the vehicle air conditioner 1 according to the invention, as described above, since the sub-condenser 4 is disposed at a position permitting reception of the heat from the heater core 21, in case where the refrigerant, which is over-cooled because it has passed through the main condenser 3 in the cooling operation time, is supplied to the sub-condenser 4, it is difficult to maintain the refrigerant in the over-cooled condition, which raises a high possibility that the cooling efficiency can be lowered.

Also, in the case of a structure in which the refrigerant can be supplied to the sub-condenser 4 in the cooling operation time, due to the heat from the heater core 21, there is a fear that the cycle balance in the refrigeration cycle can be deteriorated in the cooling operation time.

On the other hand, in case where the sub-condenser 4 and main condenser 3 are connected in parallel, in the cooling operation time, the refrigerant is supplied only to the main condenser 3, and, in the heating operation time, the refrigerant is supplied only to the sub-condenser 4, the above-mentioned problems can be solved: that is, not only the heating performance can be enhanced but also the cooling efficiency in the cooling operation time can be enhanced.

By the way, in the above-structured vehicle air conditioner 1, assuming that the outside air of low temperature is taken into the within-vehicle-compartment air passage P1 continuously, the evaporator 7 can be overcooled by the outside air to thereby suddenly lower the heat conversion efficiency of the evaporator 7, which makes it difficult to keep the refrigerant pressure at a proper level, resulting in the lowered in the cooling and heating efficiency. To prevent such inconvenience, in the above vehicle air conditioner 1, the temperature of the evaporator 7 is controlled in the following manner: that is, the degree of opening of the intake door 32 is finely controlled by the control unit to thereby adjust the switch-over of the introduction of the inside air and outside air with high accuracy.

Figure 2:
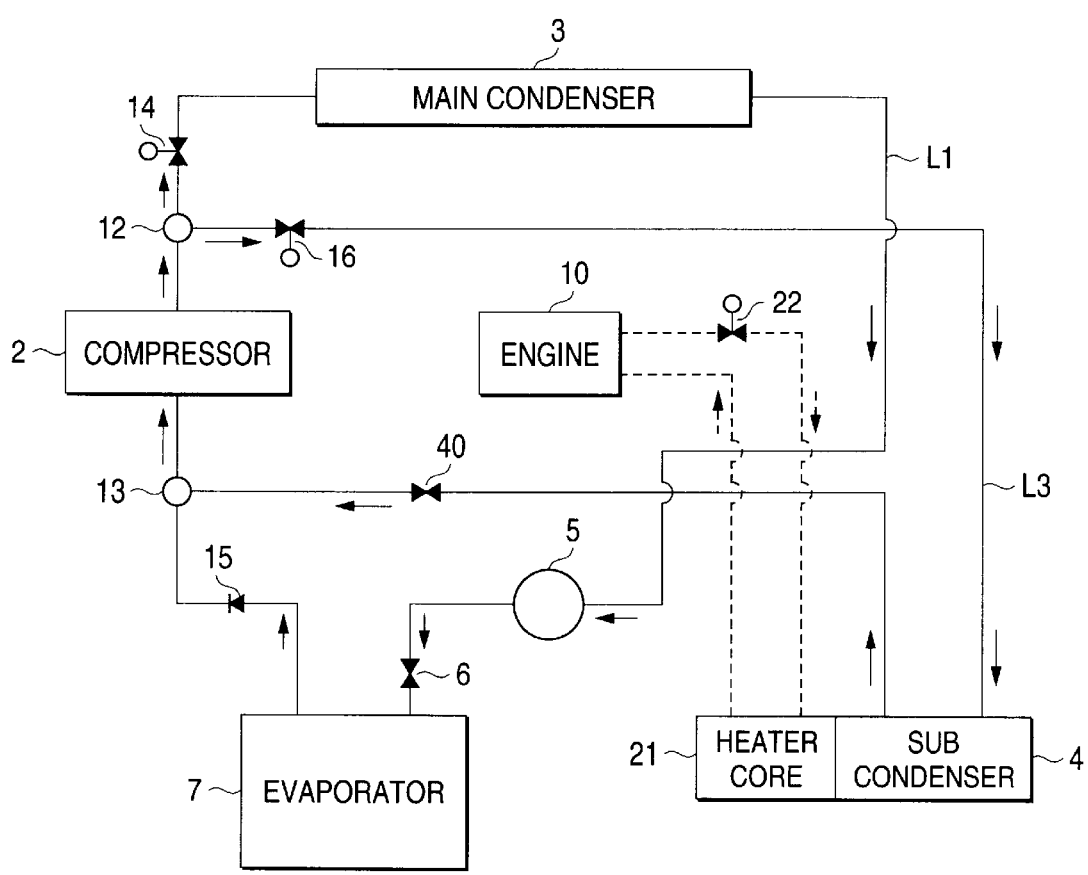
FIG. 2 is a schematic block diagram of a first modification of a vehicle air conditioner according to the first embodiment of the invention, including a third refrigerant line bypassing an evaporator.
Figure 3:
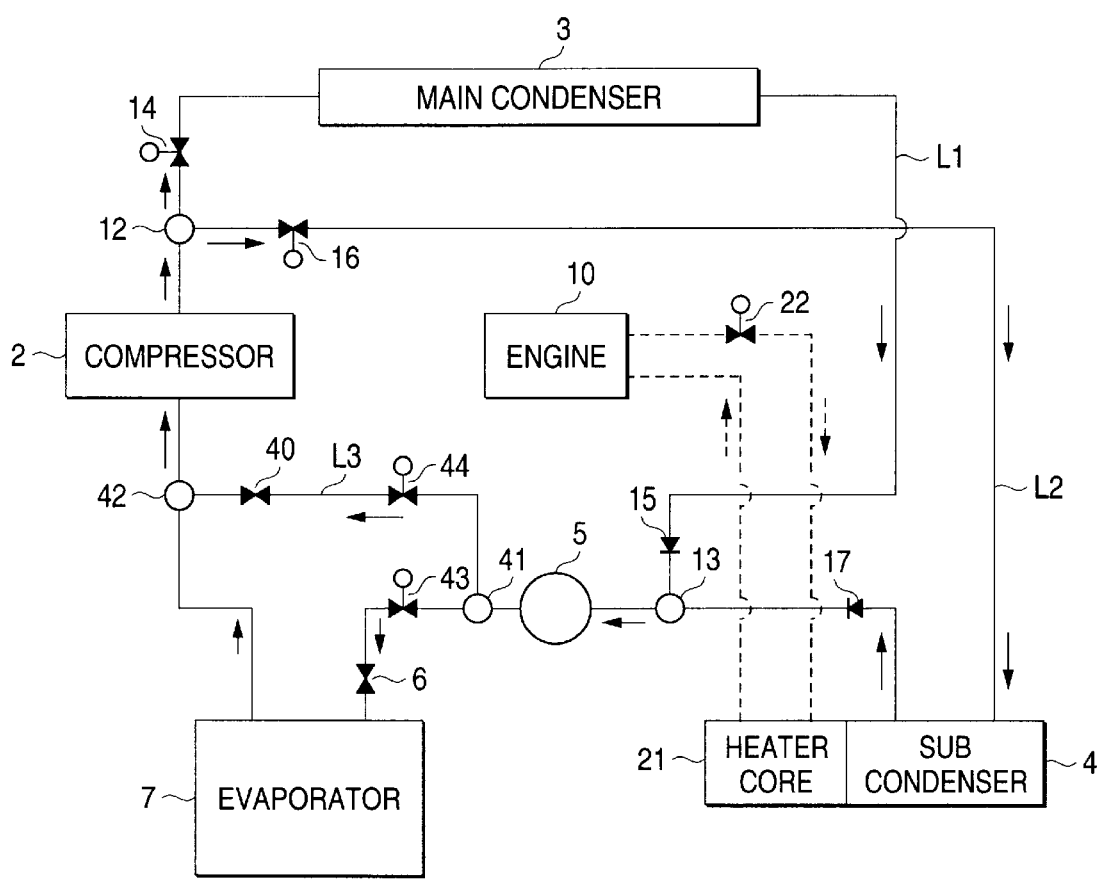
FIG. 3 is a schematic block diagram of a second modification of a vehicle air conditioner according to the first embodiment of the invention, including a third refrigerant line bypassing an evaporator.

However, when much importance is not attached to the dehumidifying function in the heating operation time, it is also effective to cope with the above-mentioned problems that the refrigerant, the heat of which has radiated due to its passage through the sub-condenser 4 in the heating operation time, is introduced into the compressor 2 while bypassing the evaporator 7. That is, instead of the second refrigerant line L2 which is selected in the heating operation time in the vehicle air condition 1 shown in FIG. 1, or in addition to the second refrigerant line L2, as shown in FIG. 2 or FIG. 3, there may be disposed a third refrigerant line L3 which bypasses the evaporator 7 and, in the heating operation time, the third refrigerant line L3 may be selected. In this case, while eliminating the above-mentioned high-accuracy control of the intake door 32 by the control unit, a similar quick heating performance to the vehicle air condition 1 shown in FIG. 1 can be realized.

Specifically, in the structure shown in FIG. 2, a passage for the refrigerant jetted out from the compressor 2 branches through the three-way connector 12 into a first refrigerant line L1 in which the refrigerant is guided through the main condenser 3 to the evaporator 7, and a third refrigerant line L3 in which the refrigerant passes through the main condenser 3 but bypasses the evaporator 7. And, in the rear stage of the evaporator 7, these first and third refrigerant lines L1 and L3 join together through the three-way connector 13.

In the first refrigerant line L1, there is disposed an electromagnetic valve 14 in the front stage of the main condenser 3 and, in the rear stage of the evaporator 7, there is disposed a check valve 15. On the other hand, in the third refrigerant line L3, there is disposed an electromagnetic valve 16 in the front stage of the main condenser 3 and, in the rear stage of the sub-condenser 4, there is disposed a pressure reducing valve 40 serving as an expander which is not connected to the evaporator 7. And, in case where the open and closed states of the electromagnetic valve 14 disposed in the first refrigerant line L1 as well as the open and closed states of the electromagnetic valve 40 disposed in the third refrigerant line L3 are switched by the control unit, the first refrigerant line L1 or third refrigerant line L3 can be selected.

That is, in the case of the cooling operation time, the control unit sets the electromagnetic valve 14 disposed in the first refrigerant line L1 in the "open" state, and sets the electromagnetic valve 40 disposed in the third refrigerant line L3 in the "closed" state. As a result of this, the first refrigerant line L1 is selected; and, the refrigerant jetted out from the compressor 2 is supplied sequentially to the main condenser 3, liquid tank 5, expansion valve 6 and evaporator 7 in this order, and is finally sucked into the compressor 2 again. On the other hand, in the case of the heating operation time, the control unit sets the electromagnetic valve 14 disposed in the first refrigerant line L1 in the "closed" state, and sets the electromagnetic valve 40 disposed in the third refrigerant line L3 in the "open" state. As a result of this, the third refrigerant line L3 is selected; and, the refrigerant jetted out from the compressor 2 is supplied to the sub-condenser 3 and pressure reducing valve 40, bypasses the evaporator 7 and is finally sucked into the compressor 2 again.

Also, in the structure shown in FIG. 3, a passage for the refrigerant jetted out from the compressor 2 branches through the three-way connector 12 into a first refrigerant line L1 in which the refrigerant passes through main condenser 3, and a second refrigerant line L2 in which the refrigerant passes through the sub-condenser 4. And, in the front stage of the liquid tank 5, these first and second refrigerant lines L1 and L2 join together through the three-way connector 13. Also, the refrigerant flow passage, which joined in the front stage of the liquid tank 5, further branches, through the three-way connector 41 disposed in the rear stage of the liquid tank 5, into a refrigerant line (the first refrigerant line L1 or second refrigerant line L2) in which the refrigerant passes through the evaporator 7, and a third refrigerant line L3 in which the refrigerant bypasses the evaporator 7. And, the first refrigerant line L1 or second refrigerant line L2 and the third refrigerant line L3 joins together through a three-way connector 42 in the front stage of the compressor 2.

In the first refrigerant line L1, there is disposed an electromagnetic valve 14 in the front stage of the main condenser 3; and, in the rear stage of the main condenser 3, there is disposed a check valve 15. Similarly, in the second refrigerant line L2 as well, there is disposed an electromagnetic valve 16 in the front stage of the sub-condenser 4; and, in the rear stage of the sub-condenser 4, there is disposed a check valve 17. Further, in the front stage of the expansion valve 6 of the first refrigerant line L1 or second refrigerant line L2, there is disposed an electromagnetic valve 43. On the other hand, in the case of the third refrigerant line L3, there is disposed a pressure reducing valve 40 serving as an expander which is not connected to the evaporator 7; and, in the front stage of the pressure reducing valve 40, there is disposed an electromagnetic valve 44. And, in case where the open and closed states of the respective electromagnetic valves 14, 16, 43, 44 are switched by the control unit, the first refrigerant line L1, or second refrigerant line L2, or third refrigerant line L3 can be selected.

That is, in the cooling operation time, the control unit sets the electromagnetic valves 14 and 43 respectively in the "open" states, and sets the electromagnetic valves 16 and 44 respectively in the "closed" states. In response to this, the first refrigerant line L1 is selected, and the refrigerant jetted out from the compressor 2 is supplied to the main condenser 3, liquid tank 5, expansion valve 6 and evaporator 7 in this order and is finally sucked into the compressor 2 again. On the other hand, in the heating operation time, the control unit sets the electromagnetic valves 14 and 43 respectively in the "closed" states, and sets the electromagnetic valves 16 and 44 respectively in the "open" states. In response to this, the third refrigerant line L3 is selected, and the refrigerant jetted out from the compressor 2 is supplied to the sub-condenser 4, liquid tank 5 and pressure reducing valve 40 in this order, bypasses the evaporator 7 and is then returned into the compressor 2 again. Also, in case where the control unit is structured such that, in the heating operation time, it sets the electromagnetic valves 14 and 44 respectively in the "closed" states and sets the electromagnetic valves 16 and 43 respectively in the "open" states, the second refrigerant line L2 is selected, and the refrigerant jetted out from the compressor 2 is supplied to the sub-condenser 4, liquid tank 5, expansion valve 6 and evaporator 7 in this order, and is then sucked into the compressor 2 again.

By the way, in the structures shown in FIGS. 2 and 3, in case where, in the heating operation time, the third refrigerant line L3 is selected, the heat of the refrigerant is radiated by the sub-condenser 4 and the refrigerant is then expanded by the pressure reducing valve 40, so that the temperature of the refrigerant becomes low; that is, the refrigerant of low temperature is sucked into the compressor 2 without the heat of the refrigerant being absorbed by the evaporator 7. Therefore, in the heating operation time, the temperature of the refrigerant jetted out from the compressor 2 is apt to be low, which raises a fear that the low-temperature refrigerent can provide an obstacle in the way of sufficient fulfillment of the quick heating performance.

Figure 4:
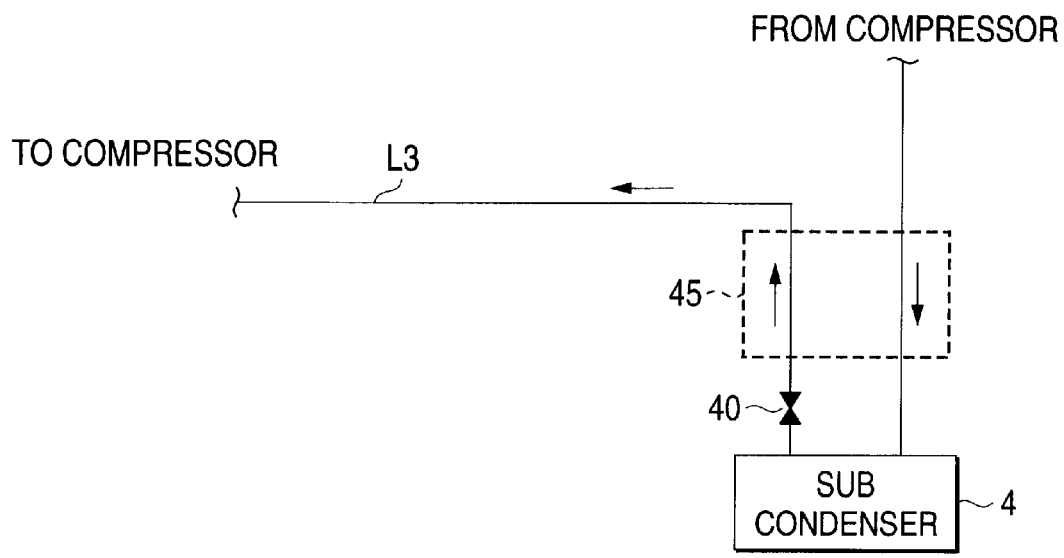
FIG. 4 is a typical view of a modification of the third refrigerant line including an inter-refrigerant heat exchanger for exchanging heat between a refrigerant expanded by a pressure reducing valve and a refrigerant flowing through the front stage of a sub-condenser.
Figure 5:
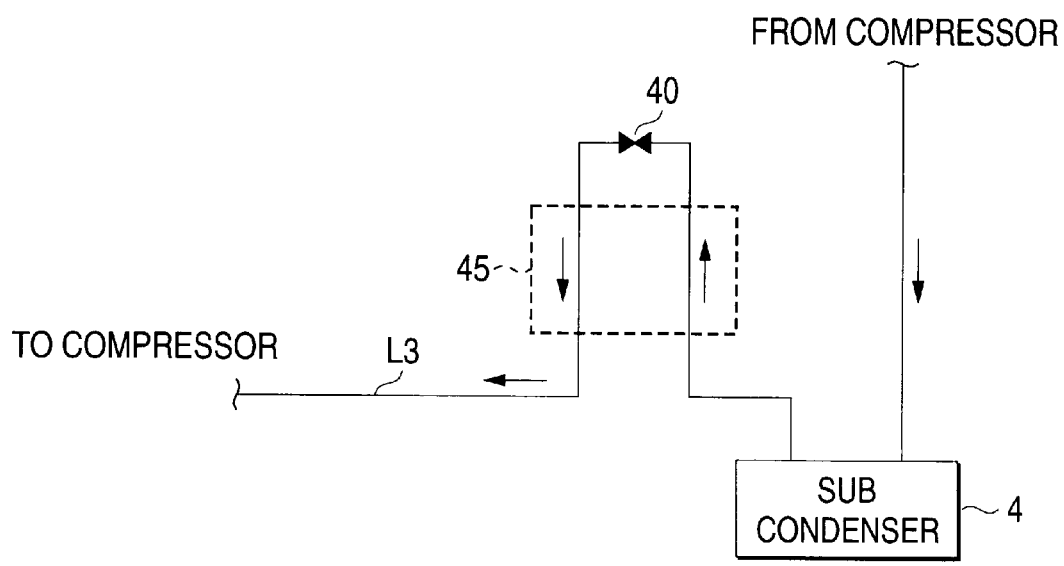
FIG. 5 is a typical view of a second modification of the third refrigerant line including an inter-refrigerant heat exchanger for exchanging heat between a refrigerant expanded by a pressure reducing valve and a refrigerant flowing through the front stage of the pressure reducing valve.

In this case, as shown in FIG. 4, preferably, in the third refrigerant line L3, there may be disposed an inter-refrigerant heat exchanger 45 which is used to exchange heat between the refrigerant expanded by the pressure reducing valve 40 and the refrigerant flowing in the front stage of the sub-condenser 4. Also, as shown in FIG. 5, in the third refrigerant line L3, there may be disposed an inter-refrigerant heat exchanger 45 which is used to exchange heat between the refrigerant expanded by the pressure reducing valve 40 and the refrigerant flowing in the front stage of the pressure reducing valve 40.

Figure 6:
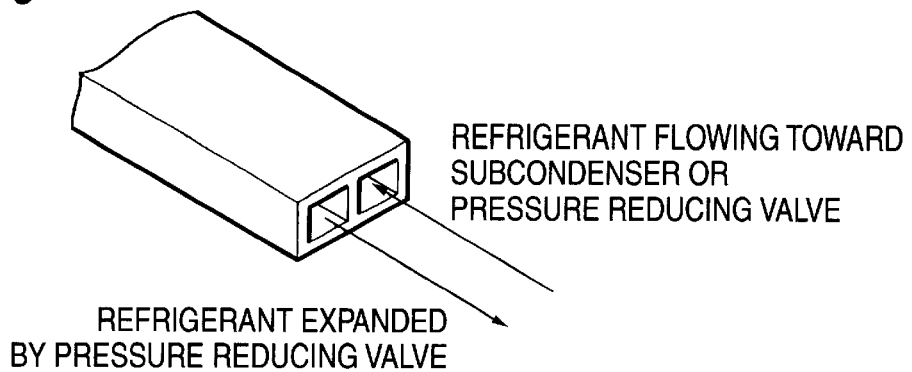
FIG. 6 is a perspective view of an embodiment of an integral type of pipe member used as the inter-refrigerant heat exchanger.
Figure 7:
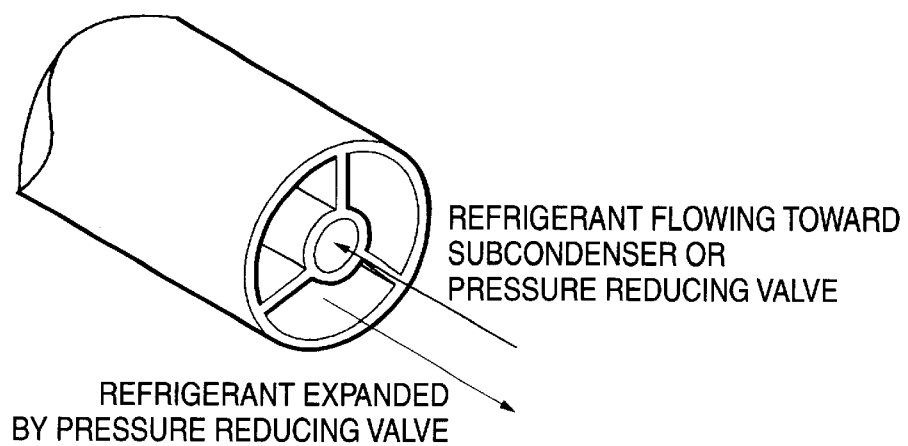
FIG. 7 is a perspective view of a second embodiment of an integral type of pipe member used as the inter-refrigerant heat exchanger.
Figure 8:
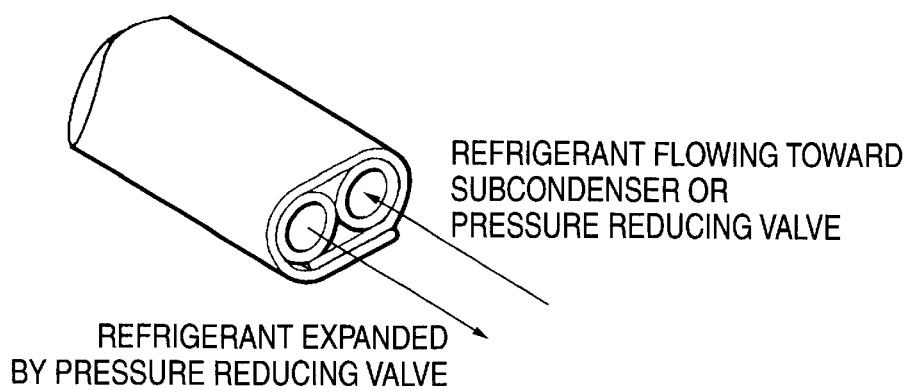
FIG. 8 is a perspective view of an embodiment of a composite type of pipe member used as the inter-refrigerant heat exchanger.

As the inter-refrigerant heat exchanger 45, for example, as shown in FIGS. 6 and 7, there can be used an integral type of pipe member structured such that a pipe member in the rear stage of the pressure reducing valve 40 and a pipe member in the front stage of the sub-condenser 4 or a pipe member in the front stage of the pressure reducing valve 40 are formed as an integral body; or, as shown in FIG. 8, a composite type of pipe member structured such that a pipe member in the rear stage of the pressure reducing valve 40 and a pipe member in the front stage of the sub-condenser 4 or a pipe member in the front stage of the pressure reducing valve 40 are closely contacted with each other. In case where such integral type of pipe member or such composite type of pipe member is used as the inter-refrigerant heat exchanger 45, when the refrigerant moving toward the sub-condenser 4 or the refrigerant moving toward the pressure reducing valve 40 flows into one pipe and the refrigerant expanded by the pressure reducing valve 40 flows into the other pipe, heat can be exchanged effectively between these refrigerants, so that the refrigerant expanded by the pressure reducing valve 40 can be heated.

As described above, in case where the inter-refrigerant heat exchanger 45 is disposed in the third refrigerant line L3 and the refrigerant expanded by the pressure reducing valve 40 is heated due to the heat exchange operation to be executed by the inter-refrigerant heat exchanger 45, even when the refrigerant is made to bypass the evaporator 7, the temperature of the refrigerant jetted out from the compressor 2 can be raised to thereby be able to obtain an excellent quick heating performance.

Figure 9:
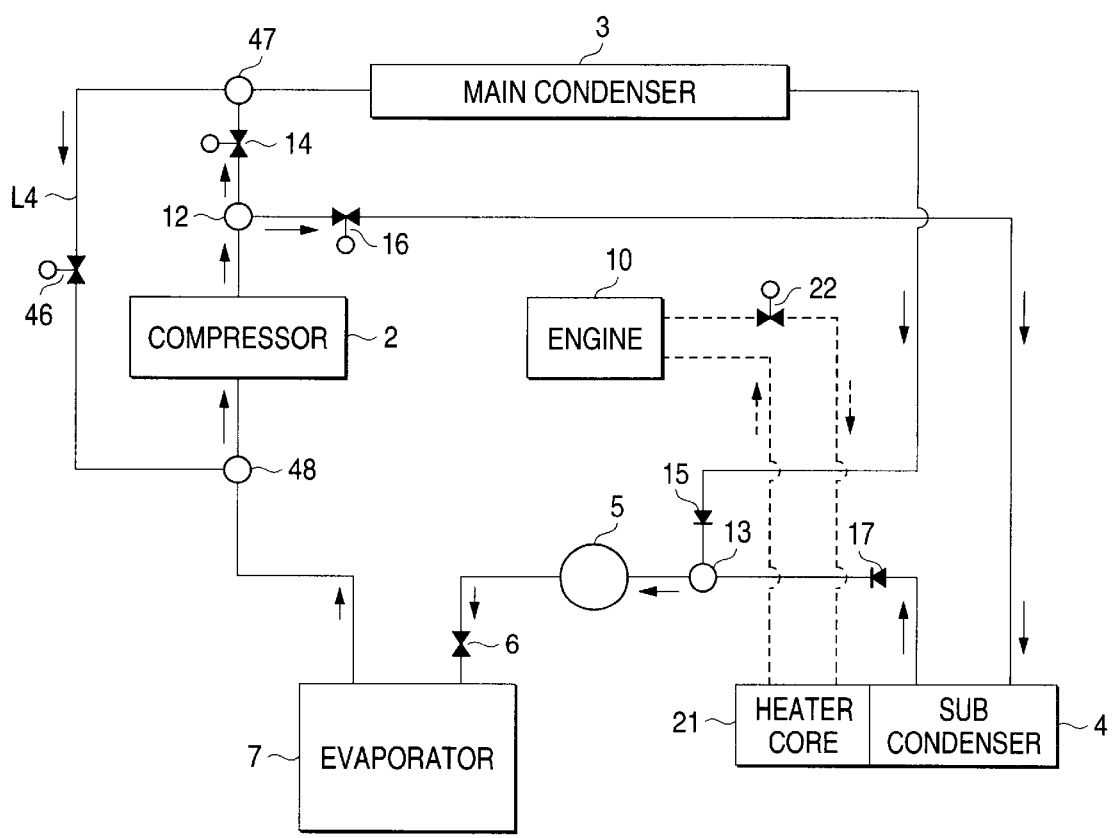
FIG. 9 is a schematic block diagram of the structure of a third modification of a vehicle air conditioner according to the first embodiment of the invention, including a refrigerant collecting line.

By the way, in the vehicle air conditioners 1 respectively shown in FIGS. 1 to 3, the sub-condenser 4 and main condenser 3 are connected in parallel, while the main condenser 3 is used only in the cooling operation time but is not used in the heating operation time. Therefore, in order to enhance the use efficiency of the main condenser 3, as shown in FIG. 9, preferably, there may be disposed a refrigerant collecting line L4 which is used to connect the refrigerant sucking side of the compressor 2 with the main condenser 3 and, when the vehicle air conditioner 1 is switched from the cooling operation to the heating operation, using the refrigerant collecting line L4, the refrigerant staying in the main condenser 3 may be collected and sucked into the compressor 2.

In the structure employing the above refrigerant collecting line L4, in case where, when switching the vehicle air conditioner 1 from the cooling operation to the heating operation, under the control of the control unit, an electromagnetic valve 46 disposed in the intermediate portion of a pipe member forming the refrigerant collecting line L4 is set in the "open" state, the refrigerant staying in the main condenser 3 can be sucked through three-way connectors 47, 48 into the compressor 2, thereby being able to enhance the refrigerant use efficiency.

However, in the vehicle air conditioner 1 according to the invention, as described hereinabove, in the heating operation time, the temperature load of the sub-condenser 4 can be increased and thus the refrigerant discharge pressure can be increased. Therefore, when a sufficient quantity of refrigerant can be secured even in case where the refrigerant staying in the main condenser 3 is not collected, the above-mentioned refrigerant collecting line L4 may not be disposed. In case where the refrigerant collecting line L4 is not disposed, the size and weight of the whole of the vehicle air conditioner 1 can be reduced accordingly.

Figure 10:
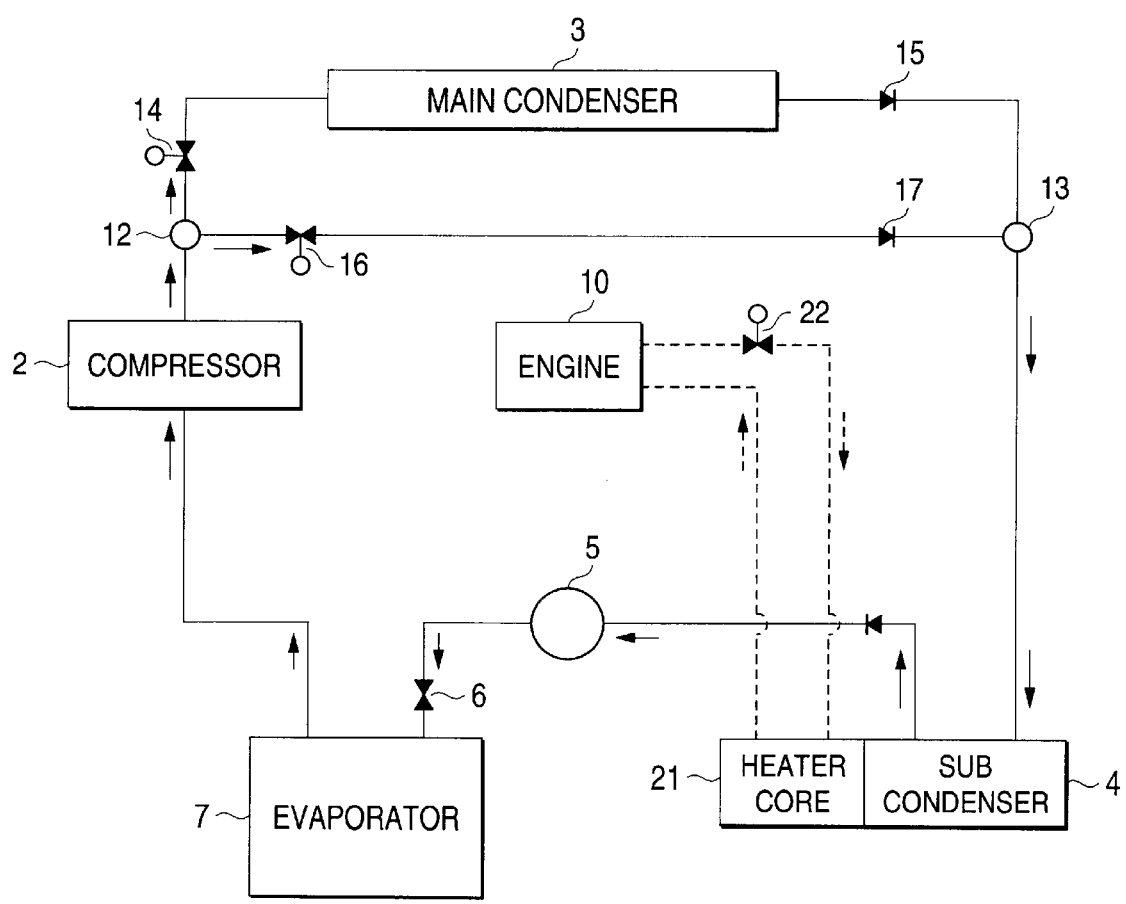
FIG. 10 is a schematic block diagram of the structure of a fourth modification of a vehicle air conditioner according to the first embodiment of the invention, in which a main condenser and a sub-condenser are connected in series with each other.

Also, while description has been given heretofore of an embodiment in which the sub-condenser 4 and main condenser 3 are connected in parallel and thus the sub-condenser 4 and main condenser 3 can be used selectively, in case where special importance is attached to the heating performance but much importance is not attached to the cooling performance, as shown in FIG. 10, the three-way connector 13 may be disposed in the front stage of the sub-condenser 4 to thereby connect the sub-condenser 4 and main condenser 3 in series with each other, and thus, in the cooling operation time, the refrigerant, which has passed through the main condenser 3, may be supplied to the sub-condenser 4.

By the way, even in case where the sub-condenser 4 and main condenser 3 are connected in series with each other, there may be disposed such a third refrigerant line L3 as shown in FIG. 2 or FIG. 3 in which the refrigerant bypasses the evaporator 7 and, in the heating operation time, by selecting this third refrigerant line L3, the refrigerant, the heat of which has been radiated by the sub-condenser 4, may bypass the evaporator 7 and may be then sucked into the compressor 7.

While description has been given hereinbefore of a specific embodiment of a vehicle air conditioner according to the invention, the invention is not limited to the specific embodiment but the invention can also be widely applied to an air conditioner for a vehicle in which, in the within-vehicle-compartment air passage P1, there are disposed at least a within-vehicle-compartment heat exchanger serving as a heat radiator in the heating operation and a heat generator.

Specifically, the invention can also be effectively applied to, for example, a vehicle air conditioner of a so-called hot gas cycle disclosed in JP-A-5-223357 and a vehicle air conditioner of a so-called heat pump cycle disclosed in JP-A-2-290475.

Figure 11:
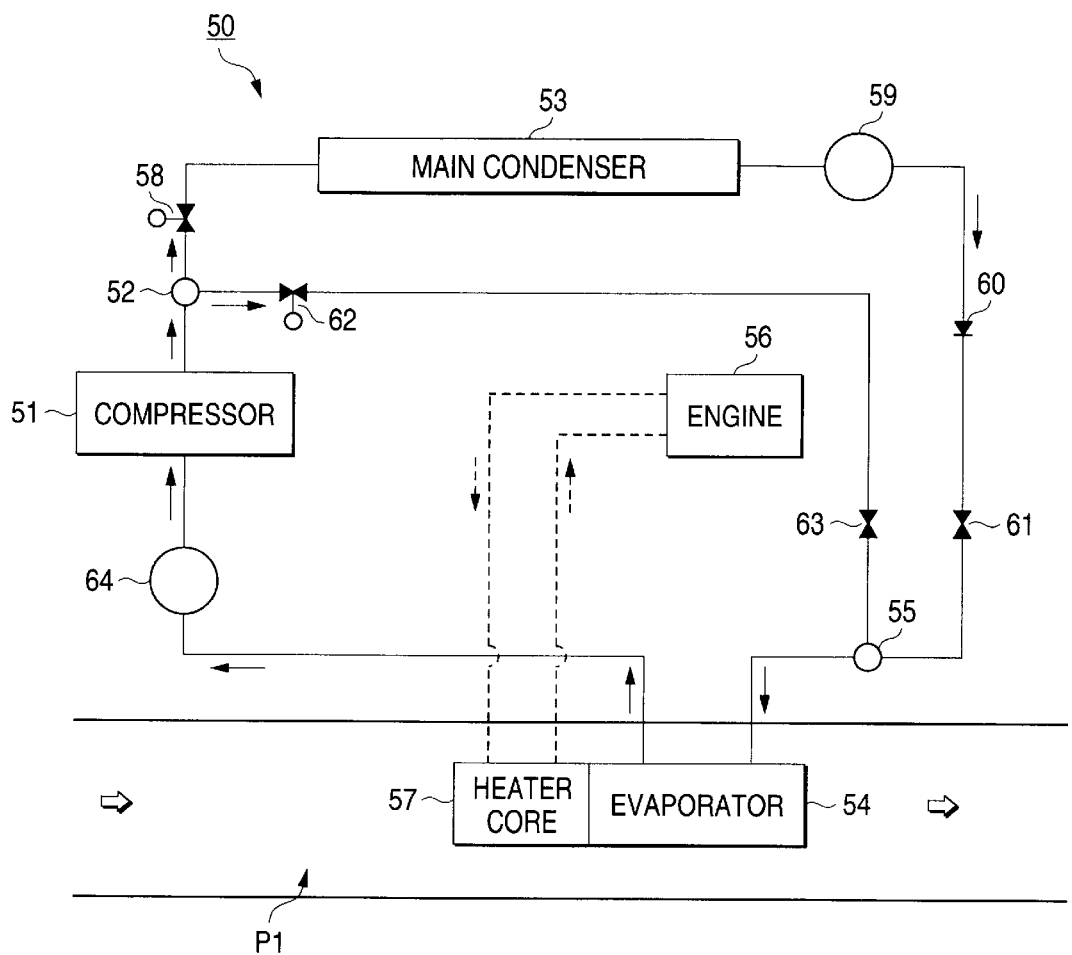
FIG. 11 is a schematic block diagram of the structure of a vehicle air conditioner of a hot gas cycle to which to the invention is applied.

Now, FIG. 11 shows an embodiment of the structure of a vehicle air conditioner of a hot gas cycle to which the invention is applied. In a vehicle air conditioner 50 shown in FIG. 11, a passage for a refrigerant jetted out from a compressor 51 branches through a three-way connector 52 into a refrigerant line in which the refrigerant passes through a condenser 53 serving as an outside-vehicle-compartment heat exchanger, and a refrigerant line in which the refrigerant bypasses the condenser 53. And, these two refrigerant lines join together through a three-way connector 55 in the front stage of an evaporator 54 serving as a within-vehicle-compartment heat exchanger disposed in a within-vehicle-compartment air passage P1.

In the within-vehicle-compartment air passage P1, in addition to the evaporator 54, there is disposed a heater core 57 serving as a heat generator which exchanges heat using the cooling water of an engine 56. And, the evaporator 54 is disposed at a position which permits reception of the heat from the heater core 57.

In the refrigerant line in which the refrigerant passes through the condenser 53, there is disposed an electromagnetic valve 58 in the front stage of the condenser 53 and there are disposed a liquid tank 59, a check valve 60 and first an expander 61 respectively in the rear stage of the condenser 53. On the other hand, in the refrigerant line in which the refrigerant bypasses the condenser 53, there are disposed an electromagnetic valve 62 and an expander 63. Also, in the passage of the refrigerant passing through the evaporator 54 and flowing toward the compressor 51, there is disposed an accumulator 64.

In the vehicle air conditioner 50 of a hot gas cycle according to the invention, in case where the open and closed states of the electromagnetic valves 58 and 62 are switched by a control unit (not shown) which controls the operation of the whole of the vehicle air conditioner 50, the refrigerant line passing through the condenser 53 or the refrigerant line bypassing the condenser 53 can be selected.

That is, in the cooling operation time, the control unit sets the electromagnetic valve 58 in the "open" state and sets the electromagnetic valve 62 in the "closed" state. In response to this, the refrigerant line passing through the condenser 53 is selected and the refrigerant jetted out from the compressor 51 is supplied to the condenser 53, liquid tank 59, first an expander 61, evaporator 54 and accumulator 64 in this order, and is then sucked into the compressor 51 again. In this case, the evaporator 54 functions as a heat absorber, thereby allowing the cold air to flow into the within-vehicle-compartment air passage P1.

On the other hand, in the heating operation time, the control unit sets the electromagnetic valve 58 in the "closed" state and sets the electromagnetic valve 62 in the "open" state. In response to this, the refrigerant line bypassing the condenser 53 is selected and the refrigerant jetted out from the compressor 51 is supplied to the second expander 63, evaporator 54 and accumulator 64 in this order, and is then sucked into the compressor 51 again. In this case, the evaporator 54 functions as a heat radiator, thereby allowing the warm air to flow into the within-vehicle-compartment air passage P1.

Here, in the vehicle air conditioner 50 according to the invention, since the evaporator 54 serving as a within-vehicle-compartment heat exchanger is disposed at a position which permits reception of the heat from the heater core 57 serving as a heat generator, even in a state where the air does not flow through the within-vehicle-compartment air passage P1, the heat from the heater core 57 can be effectively transmitted to the evaporator 54. Therefore, in the vehicle air conditioner 50, just after it is started, the temperature load of the evaporator 54 can be increased effectively and thus the refrigerant discharge pressure can be raised rapidly, so that, similarly to the previously described vehicle air conditioner 1, a very excellent quick heating performance can be fulfilled.

Especially, as shown in FIG. 11, in case where the heater core 57 serving as a heat generator is disposed upstream of the evaporator 54 serving as a within-vehicle-compartment heat exchanger in the within-vehicle-compartment air passage P1, even when the cold outside air is introduced into the within-vehicle-compartment air passage P1, since the cold outside air is contacted through the heater core 57 with the evaporator 54, the temperature load of the evaporator 54 is not lowered so much, which makes it possible to raise the refrigerant discharge pressure further quickly. Also, in this case, because the heat of the heater core 57 can also be transmitted to the evaporator 54 through the air flowing through the within-vehicle-compartment air passage P1, the transmission efficiency of the heat to be transmitted from the heater core 57 to the evaporator 54 can be enhanced, which makes it possible to fulfill the quick heating performance still further.

Also, in case where the evaporator 54 serving as a within-vehicle-compartment heat exchanger and the heater core 57 serving as a heat generator are formed as an integral body, the heat from the heater core 57 is transmitted directly to the evaporator 54. Thanks to this, the transmission efficiency of the heat to be transmitted from the heater core 57 to the evaporator 54 can be enhanced still further, thereby being able to fulfill a very excellent quick heating performance.

Further, in the present vehicle air conditioner 50, just after it is started, the temperature load of the evaporator 54 can be increased effectively and thus the refrigerant discharge pressure can be raised rapidly, thereby being able to reduce the quantity of the refrigerant to be enclosed within the refrigeration cycle. Thanks to this, similarly to the previously described vehicle air conditioner 1, there can be provided a great advantage in reducing the size and weight of the whole of the vehicle air conditioner.

Figure 12:
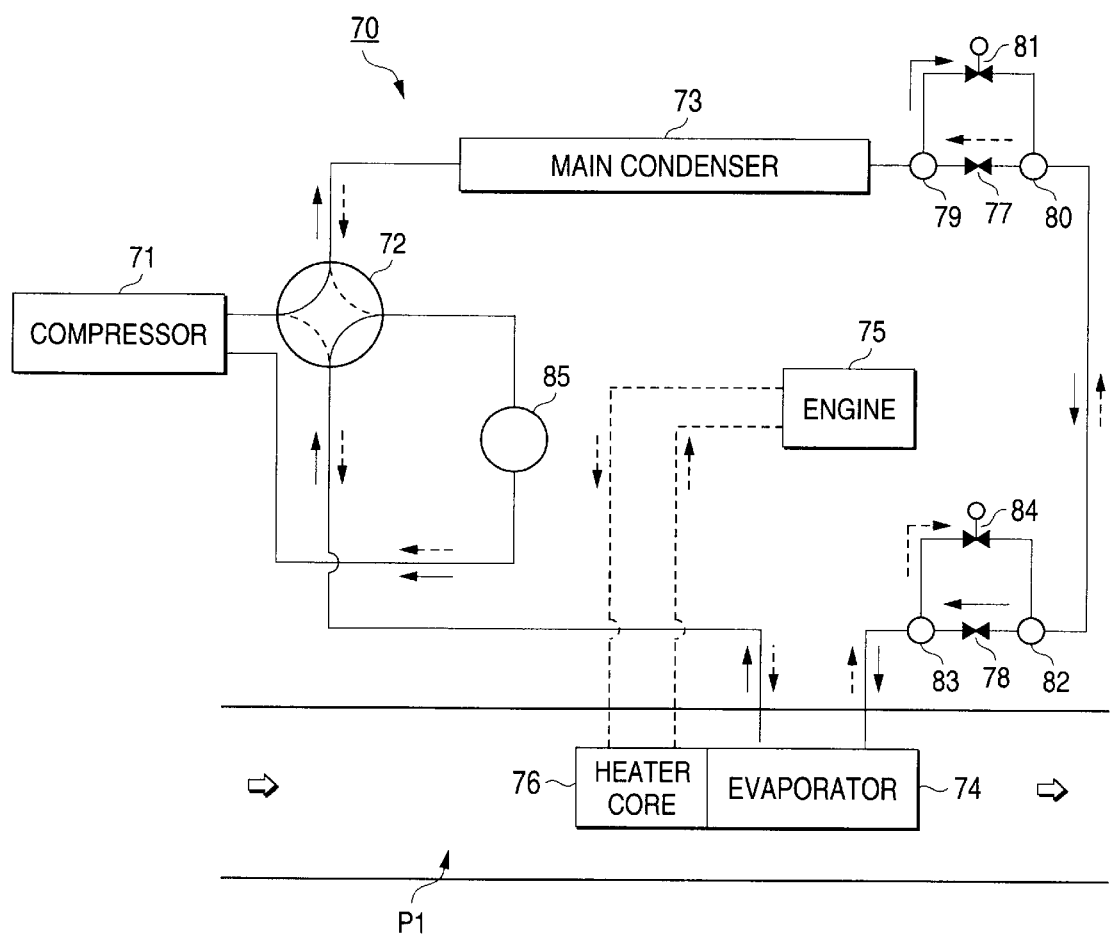
FIG. 12 is a schematic block diagram of the structure of a vehicle air conditioner of a heat pump cycle to which to the invention is applied.

Next, FIG. 12 shows an embodiment of the structure of a vehicle air conditioner of a heat pump cycle according to the invention. In a vehicle air conditioner 70 shown in FIG. 12, a passage for a refrigerant jetted out from a compressor 71 can be reversed by a four-way valve 72; and, therefore, the supply order of the refrigerant to be supplied to a condenser 73 serving as an outside-vehicle-compartment heat exchanger and to an evaporator 74 disposed in a within-vehicle-compartment air passage P1 and serving as a within-vehicle-compartment heat exchanger can be switched.

Also, in the vehicle air conditioner 70, in the within-vehicle-compartment air passage P1, in addition to the evaporator 70, there is disposed a heater core 76 which serves as a heat generator for exchanging heat using the cooling water of an engine 75. And, the evaporator 74 is disposed at a position which permits reception of the heat from the heater core 76.

In a refrigerant passage between the condenser 73 and evaporator 74, there is disposed first an expander 77 in the vicinity of the condenser 73, while there is disposed a second expander 78 in the vicinity of the evaporator 74. And, in this refrigerant passage, there is disposed a detour line in which the refrigerant bypasses the first an expander 77 through three-way connectors 79, 80 respectively provided before and behind the first an expander 77; and, in the detour line, there is disposed an electromagnetic valve 81. Similarly, there is disposed another detour line in which the refrigerant bypasses the second expander 78 through three-way connectors 82, 83 respectively provided before and behind the second expander 78; and, in this detour line, there is disposed an electromagnetic valve 84. Also, on the refrigerant suction side of the compressor 71, there is disposed an accumulator 85.

In the vehicle air conditioner 70 of a heat pump cycle, in case where the directions of the refrigerant passing through the four-way connector 72 as well as the open and closed states of the electromagnetic valves 81, 84 are switched by a control unit (not shown) which controls the operation of the whole of the vehicle air conditioner 70, the passage (the forward-direction passage or the reversed-direction passage) of the refrigerant jetted out from the compressor 71 as well as the first an expander 77 or a second expander 78 can be selected.

That is, in the cooling operation time, the control unit sets the direction of the refrigerant passing through the four-way connector 72 in a direction shown by a solid line in FIG. 12, sets the electromagnetic valve 81 in the "open" state, and sets the electromagnetic valve 84 in the "closed" state. In response to this, the refrigerant jetted out from the compressor 71 is supplied to the condenser 73, a second expander 78, evaporator 74 and accumulator 85 in this order and is then sucked into the compressor 71 again. In this case, the condenser 73 functions as a heat radiator and the evaporator 74 functions as a heat absorber, so that the cold air is allowed to flow through the within-vehicle-compartment air passage P1.

On the other hand, in the heating operation time, the control unit sets the direction of the refrigerant passing through the four-way connector 72 in a direction shown by a broken line in FIG. 12, sets the electromagnetic valve 81 in the "closed" state, and sets the electromagnetic valve 84 in the "open" state. In response to this, the refrigerant jetted out from the compressor 71 is supplied to the evaporator 74, first an expander 77, condenser 73 and accumulator 85 in this order and is then sucked into the compressor 71 again. In this case, the evaporator 74 functions as a heat radiator and the condenser 73 functions as a heat absorber, so that the warm air is allowed to flow through the within-vehicle-compartment air passage P1.

Here, in the vehicle air conditioner 70 of a heat pump cycle according to the invention, since the evaporator 74 serving as an within-vehicle-compartment heat exchanger is disposed at a position which permits reception of the heat from the heater core 76 serving as a heat generator, even in case where the air does not flow through the within-vehicle-compartment air passage P1, the heat from the heater core 76 can be transmitted to the evaporator 74 effectively. Therefore, in the present vehicle air conditioner 70, just after it is started, the temperature load of the evaporator 74 can be increased effectively and thus the refrigerant discharge pressure can be raised rapidly, so that, similarly to the previously described vehicle air conditioners 1 and 50, the present vehicle air conditioner 70 is able to fulfill a very excellent quick heating performance.

Especially, as shown in FIG. 12, in case where the heater core 76 serving as a heat generator is disposed upstream of the evaporator 74 which is a within-vehicle-compartment heat exchanger in the within-vehicle-compartment air passage P1, even when the cold outside air is introduced into the within-vehicle-compartment air passage P1, since the present cold outside air is contacted through the heater core 76 with the evaporator 74, the temperature load of the evaporator 74 is not lowered so much, thereby being able to raise the refrigerant discharge pressure rapidly. Also, in this case, since the heat of the heater core 76 can also be transmitted to the evaporator 74 through the air flowing in the within-vehicle-compartment air passage P1, the transmission efficiency of the heat to be transmitted from the heater core 76 to the evaporator 74 can be enhanced, which enables the present vehicle air conditioner 70 to fulfill a further excellent quick heating performance.

Also, in case where the evaporator 74 serving as a within-vehicle-compartment heat exchanger and heater core 76 serving as a heat generator are formed as an integral body, since the heat from the heater core 76 can be transmitted directly to the evaporator 74, the transmission efficiency of the heat to be transmitted from the heater core 76 to the evaporator 74 can be enhanced still further, so that the present vehicle air conditioner 70 is able to fulfill an extremely excellent quick heating performance.

Further, in the present vehicle air conditioner 70, since, just after it is started, the temperature load of the evaporator 74 can be increased effectively and thus the refrigerant discharge pressure can be raised rapidly, the quantity of the refrigerant to be enclosed in the refrigeration cycle can be reduced. Thanks to this, similarly to the previously described vehicle air conditioners 1 and 50, there can be provided a great advantage in reducing the size and weight of the whole of the vehicle air conditioner 70.

Although a vehicle air conditioner according to the invention has been described heretofore by way of several specific embodiments thereof, the structures and specifications of the respective parts forming the vehicle air conditioner can also be changed properly according to the performance required and the kinds of vehicles on which the present vehicle air conditioner is carried. For example, in the above-described embodiments, as the heat generator, there is disposed the heater core 21, 57, or 76 using the engine cooling water as a heat source; however, instead of the heater core 21, 57, or 76, there may be disposed other types of a heat generator such as a heat transfer heater.

What is claimed is:

1. An air conditioner for a vehicle, comprising:
    a compressor for compressing a refrigerant sucked therein and jetting out the compressed refrigerant therefrom;
    a first heat exchanger disposed outside a vehicle compartment, the first heat exchanger for radiating heat of the refrigerant to the outside air;
    an air passage defined inside the vehicle compartment, the air passage for passing an inside air and outside air selectively introduced thereinto;
    a second heat exchanger disposed in the air passage, the second heat exchanger for radiating heat of the refrigerant to the air inside the air passage;
    an expander for expanding the refrigerant after heat of the refrigerant is radiated by at least one of the first heat exchanger and the second heat exchanger;
    a third heat exchanger disposed upstream of the second heat exchanger in the air passage, the third heat exchanger for absorbing heat from the refrigerant inside the air passage after expanded by the expander; and
    a heat generator disposed in the air passage,
    wherein the second heat exchanger is disposed at a position to receive heat from the heat generator regardless of a flow of the inside air, and
    wherein the heat generator is disposed upstream of the second heat exchanger in the air passage.

2. The air conditioner as set forth in claim 1, further comprising:
    a first refrigerant line for supplying the refrigerant jetted out from the compressor to the expander through the first heat exchanger and allowing the refrigerant to be sucked into the compressor through the third heat exchanger;
    a second refrigerant line for supplying the refrigerant jetted out from the compressor to the expander through the second heat exchanger and allowing the refrigerant to be sucked into the compressor through the third heat exchanger; and
    a switch for selectively switching the first refrigerant line and the second refrigerant line over to each other.

3. The air conditioner as set forth in claim 1, further comprising:
    a refrigerant line for supplying the refrigerant jetted out from the compressor to a second expander not connected to the third heat exchanger through the second heat exchanger and allowing the refrigerant to bypass the third heat exchanger and to be sucked into the compressor; and
    a switch for switching selection of the refrigerant line.

4. The air conditioner as set forth in claim 3, further comprising a fourth heat exchanger disposed in the refrigerant line, the fourth heat exchanger for exchanging heat between the refrigerant expanded by the second expander and the refrigerant flowing through the front stage of the second expander.

5. The air conditioner as set forth in claim 3, further comprising a fourth heat exchanger disposed in the refrigerant line, the fourth heat exchanger for exchanging heat between the refrigerant expanded by the second expander and the refrigerant flowing through the front stage of the second heat exchanger.

6. The air conditioner as set forth in claim 1, wherein the second heat exchanger and the heat generator are integrally formed.

7. The air conditioner as set forth in claim 4, wherein the fourth heat exchanger has a rectangular-shaped housing enclosing: a) a first rectangular-shaped path for directing refrigerant toward the second expander, and b) a second rectangular-shaped path for directing refrigerant expanded by the second expander.

8. The air conditioner as set forth in claim 5, wherein the fourth heat exchanger has a rectangular-shaped housing enclosing: a) a first rectangular-shaped path for directing refrigerant toward the second heat exchanger, and b) a second rectangular-shaped path for directing refrigerant expanded by the second expander.

9. The air conditioner as set forth in claim 4, wherein the fourth heat exchanger has a circular-shaped housing enclosing: a) a first circular-shaped path for directing refrigerant toward the second expander, and b) a second circular-shaped path for directing refrigerant expanded by the second expander, the second circular-shaped path being larger than and concentric with the first circular-shaped path.

10. The air conditioner as set forth in claim 5, wherein the fourth heat exchanger has a circular-shaped housing enclosing: a) a first circular-shaped path for directing refrigerant toward the second heat exchanger, and b) a second circular-shaped path for directing refrigerant expanded by the second expander, the second circular-shaped path being larger than and concentric with the first circular-shaped path.

11. The air conditioner as set forth in claim 4, wherein the fourth heat exchanger has an oval-shaped housing enclosing: a) a first circular-shaped path for directing refrigerant toward the second expander, and b) a second circular-shaped path for directing refrigerant expanded by the second expander, the second circular-shaped path being disposed adjacent to the first circular-shaped path within the oval-shaped housing.

12. The air conditioner as set forth in claim 5, wherein the fourth heat exchanger has an oval-shaped housing enclosing: a) a first circular-shaped path for directing refrigerant toward the second heat exchanger, and b) a second circular-shaped path for directing refrigerant expanded by the second expander, the second circular-shaped path being disposed adjacent to the first circular-shaped path within the oval-shaped housing.

13. The air conditioner as set forth in claim 1, wherein the second heat exchanger and the heat generator both include fins, and
    wherein the fins of the second heat exchanger are integrally formed with the fins of the heat generator.

14. An air conditioner for a vehicle, comprising:
    a compressor for compressing a refrigerant sucked therein and jetting out the compressed refrigerant to allow the refrigerant to circulate;
    an air passage defined inside a vehicle component, the air passage for passing an inside air and outside air introduced selectively;
    a heat exchanger disposed in the air passage to receive the refrigerant from the air passage;
    a heat generator disposed in the air passage; and
    an expander for expanding the refrigerant,
    wherein the heat exchanger is disposed at a position to receive heat from the heat generator regardless of a flow of the inside air, and wherein the heat generator is disposed upstream of the heat exchanger in the air passage.

15. The air conditioner as set forth in claim 14, wherein the heat exchanger and the heat generator are integrally formed.

16. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

an expander for expanding the refrigerant after heat of the refrigerant is radiated by at least one of the first heat exchanger and the second heat exchanger;

a third heat exchanger disposed upstream of the second heat exchanger in the air passage, the third heat exchanger for absorbing heat from the refrigerant inside the air passage after expanded by the expander; and a heat generator disposed in the air passage, wherein the second heat exchanger is disposed at a position proximate to the heat generator in order to receive heat from the heat generator, and wherein the heat generator is disposed upstream of the second heat exchanger in the air passage.

17. An air conditioner for a vehicle, comprising:

a compressor for compressing a refrigerant sucked therein and jetting out the compressed refrigerant to allow the refrigerant to circulate;

an air passage defined inside a vehicle component, the air passage for passing an inside air and outside air introduced selectively;

a heat exchanger disposed in the air passage to receive the refrigerant from the air passage;

a heat generator disposed in the air passage; and, an expander for expanding the refrigerant, wherein the heat exchanger is disposed at a position proximate to the heat generator in order to receive heat from the heat generator, and wherein the heat generator is disposed upstream of the heat exchanger in the air passage.

18. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

an expander for expanding the refrigerant after heat of the refrigerant is radiated by at least one of the first heat exchanger and the second heat exchanger;

a third heat exchanger disposed upstream of the second heat exchanger in the air passage, the third heat exchanger for absorbing heat from the refrigerant inside the air passage after expanded by the expander; and a heat generator disposed in the air passage;

a first refrigerant line for supplying the refrigerant jetted out from the compressor to the expander through the first heat exchanger and allowing the refrigerant to be sucked into the compressor through the third heat exchanger;

a second refrigerant line for supplying the refrigerant jetted out from the compressor to the expander through the second heat exchanger and allowing the refrigerant to be sucked into the compressor through the third heat exchanger; and a switch for selectively switching the refrigerant to one of the first refrigerant line and the second refrigerant line, wherein the second heat exchanger is disposed at a position to receive heat from the heat generator regardless of a flow of the inside air, wherein the refrigerant passing through the first refrigerant line bypasses the second heat exchanger, and wherein the refrigerant passing through the second refrigerant line bypasses the first heat exchanger.

19. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

a first expander for expanding the refrigerant after heat of the refrigerant is radiated by the first heat exchanger;

a second expander for expanding the refrigerant after heat of the refrigerant is radiated by the second heat exchanger;

a third heat exchanger disposed upstream of the second heat exchanger in the air passage, the third heat exchanger for absorbing heat from the refrigerant inside the air passage after expanded by the first expander; and a heat generator disposed in the air passage;

a first refrigerant line for supplying the refrigerant jetted out from the compressor to the first expander through the first heat exchanger and allowing the refrigerant to be sucked into the compressor through the third heat exchanger;

a second refrigerant line for supplying the refrigerant jetted out from the compressor to the second expander not connected to the third heat exchanger through the second heat exchanger and allowing the refrigerant to bypass the third heat exchanger and to be sucked into the compressor; and a switch for selectively switching the refrigerant to one of the first refrigerant line and the second refrigerant line, wherein the refrigerant passing through the first refrigerant line bypasses the second heat exchanger, and wherein the refrigerant passing through the second refrigerant line bypasses the first heat exchanger and the third heat exchanger.

20. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

a first expander for expanding the refrigerant after heat of the refrigerant is radiated by at least one of the first heat exchanger and the second heat exchanger;

a third heat exchanger disposed upstream of the second heat exchanger in the air passage, the third heat exchanger for absorbing heat from the refrigerant inside the air passage after expanded by the first expander;

a heat generator disposed in the air passage;

a refrigerant line for supplying the refrigerant jetted out from the compressor to a second expander not connected to the third heat exchanger through the second heat exchanger and allowing the refrigerant to bypass the third heat exchanger and to be sucked into the compressor; and a switch for switching selection of the refrigerant line, wherein the second heat exchanger is disposed at a position to receive heat from the heat generator regardless of a flow of the inside air.

21. The air conditioner as set forth in claim 20, further comprising a fourth heat exchanger disposed in the refrigerant line, the fourth heat exchanger for exchanging heat between the refrigerant expanded by the second expander and the refrigerant flowing through the front stage of the second expander.

22. The air conditioner as set forth in claim 20, further comprising a fourth heat exchanger disposed in the refrigerant line, the fourth heat exchanger for exchanging heat between the refrigerant expanded by the second expander and the refrigerant flowing through the front stage of the second heat exchanger.

23. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

a first expander for expanding the refrigerant after heat of the refrigerant is radiated by at least one of the first heat exchanger and the second heat exchanger;

a third heat exchanger disposed upstream of the second heat exchanger in the air passage, the third heat exchanger for absorbing heat from the refrigerant inside the air passage after expanded by the first expander;

a heat generator disposed in the air passage;

a refrigerant line for supplying the refrigerant jetted out from the compressor to a second expander not connected to the third heat exchanger through the second heat exchanger and allowing the refrigerant to bypass the third heat exchanger and to be sucked into the compressor;

a switch for switching selection of the refrigerant line; and a fourth heat exchanger disposed in the refrigerant line, the fourth heat exchanger for exchanging heat between the refrigerant expanded by the second expander and the refrigerant flowing through the front stage of the second expander, wherein the second heat exchanger is disposed at a position to receive heat from the heat generator regardless of a flow of the inside air, and wherein the fourth heat exchanger has a rectangular-shaped housing enclosing: a) a first rectangular-shaped path for directing refrigerant toward the second expander, and b) a second rectangular-shaped path for directing refrigerant expanded by the second expander.

24. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

a first expander for expanding the refrigerant after heat of the refrigerant is radiated by at least one of the first heat exchanger and the second heat exchanger;

a third heat exchanger disposed upstream of the second heat exchanger in the air passage, the third heat exchanger for absorbing heat from the refrigerant inside the air passage after expanded by the first expander;

a heat generator disposed in the air passage;

a refrigerant line for supplying the refrigerant jetted out from the compressor to a second expander not connected to the third heat exchanger through the second heat exchanger and allowing the refrigerant to bypass the third heat exchanger and to be sucked into the compressor;

a switch for switching selection of the refrigerant line; and a fourth heat exchanger disposed in the refrigerant line, the fourth heat exchanger for exchanging heat between the refrigerant expanded by the second expander and the refrigerant flowing through the front stage of the second heat exchanger, and wherein the fourth heat exchanger has a rectangular-shaped housing enclosing: a) a first rectangular-shaped path for directing refrigerant toward the second heat exchanger, and b) a second rectangular-shaped path for directing refrigerant expanded by the second expander.

25. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

a first expander for expanding the refrigerant after heat of the refrigerant is radiated by at least one of the first heat exchanger and the second heat exchanger;

a third heat exchanger disposed upstream of the second heat exchanger in the air passage, the third heat exchanger for absorbing heat from the refrigerant inside the air passage after expanded by the first expander;

a heat generator disposed in the air passage;

a refrigerant line for supplying the refrigerant jetted out from the compressor to a second expander not connected to the third heat exchanger through the second heat exchanger and allowing the refrigerant to bypass the third heat exchanger and to be sucked into the compressor;

a switch for switching selection of the refrigerant line; and a fourth heat exchanger disposed in the refrigerant line, the fourth heat exchanger for exchanging heat between the refrigerant expanded by the second expander and the refrigerant flowing through the front stage of the second expander, wherein the second heat exchanger is disposed at a position to receive heat from the heat generator regardless of a flow of the inside air, and wherein the fourth heat exchanger has a circular-shaped housing enclosing: a) a first circular-shaped path for directing refrigerant toward the second expander, and b) a second circular-shaped path for directing refrigerant expanded by the second expander, the second circular-shaped path being larger than and concentric with the first circular-shaped path.

26. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

a first expander for expanding the refrigerant after heat of the refrigerant is radiated by at least one of the first heat exchanger and the second heat exchanger;

a third heat exchanger disposed upstream of the second heat exchanger in the air passage, the third heat exchanger for absorbing heat from the refrigerant inside the air passage after expanded by the first expander;

a heat generator disposed in the air passage;

a refrigerant line for supplying the refrigerant jetted out from the compressor to a second expander not connected to the third heat exchanger through the second heat exchanger and allowing the refrigerant to bypass the third heat exchanger and to be sucked into the compressor;

a switch for switching selection of the refrigerant line; and a fourth heat exchanger disposed in the refrigerant line, the fourth heat exchanger for exchanging heat between the refrigerant expanded by the second expander and the refrigerant flowing through the front stage of the second heat exchanger, and wherein the fourth heat exchanger has a circular-shaped housing enclosing: a) a first circular-shaped path for directing refrigerant toward the second heat exchanger, and b) a second circular-shaped path for directing refrigerant expanded by the second expander, the second circular-shaped path being larger than and concentric with the first circular-shaped path.

27. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

a first expander for expanding the refrigerant after heat of the refrigerant is radiated by at least one of the first heat exchanger and the second heat exchanger;

a third heat exchanger disposed upstream of the second heat exchanger in the air passage, the third heat exchanger for absorbing heat from the refrigerant inside the air passage after expanded by the first expander;

a heat generator disposed in the air passage;

a refrigerant line for supplying the refrigerant jetted out from the compressor to a second expander not connected to the third heat exchanger through the second heat exchanger and allowing the refrigerant to bypass the third heat exchanger and to be sucked into the compressor;

a switch for switching selection of the refrigerant line; and a fourth heat exchanger disposed in the refrigerant line, the fourth heat exchanger for exchanging heat between the refrigerant expanded by the second expander and the refrigerant flowing through the front stage of the second expander, wherein the second heat exchanger is disposed at a position to receive heat from the heat generator regardless of a flow of the inside air, and wherein the fourth heat exchanger has an oval-shaped housing enclosing: a) a first circular-shaped path for directing refrigerant toward the second expander, and b) a second circular-shaped path for directing refrigerant expanded by the second expander, the second circular-shaped path being disposed adjacent to the first circular-shaped path within the oval-shaped housing.

28. An air conditioner for a vehicle, comprising:

a compressor for compressing a refrigerant sucked therein and jetting out the compressed refrigerant therefrom;

a first heat exchanger disposed outside a vehicle compartment, the first heat exchanger for radiating heat of the refrigerant to the outside air;

an air passage defined inside the vehicle compartment, the air passage for passing an inside air and outside air selectively introduced thereinto;

a second heat exchanger disposed in the air passage, the second heat exchanger for radiating heat of the refrigerant to the air inside the air passage;

a first expander for expanding the refrigerant after heat of the refrigerant is radiated by at least one of the first heat exchanger and the second heat exchanger;

a third heat exchanger disposed upstream of the second heat exchanger in the air passage, the third heat exchanger for absorbing heat from the refrigerant inside the air passage after expanded by the first expander;

a heat generator disposed in the air passage;

a refrigerant line for supplying the refrigerant jetted out from the compressor to a second expander not connected to the third heat exchanger through the second heat exchanger and allowing the refrigerant to bypass the third heat exchanger and to be sucked into the compressor;

a switch for switching selection of the refrigerant line; and a fourth heat exchanger disposed in the refrigerant line, the fourth heat exchanger for exchanging heat between the refrigerant expanded by the second expander and the refrigerant flowing through the front stage of the second heat exchanger, and wherein the fourth heat exchanger has an oval-shaped housing enclosing: a) a first circular-shaped path for directing refrigerant toward the second heat exchanger, and b) a second circular-shaped path for directing refrigerant expanded by the second expander, the second circular-shaped path being disposed adjacent to the first circular-shaped path within the oval-shaped housing.

* * * * *